United States Patent [19]
Matsushima et al.

[11] Patent Number: 5,375,470
[45] Date of Patent: Dec. 27, 1994

[54] ACOUSTIC IMAGING SYSTEM

[75] Inventors: Tetsuya Matsushima; Yuichi Sugiyama; Atsuo Iida, all of Kawasaki, Japan

[73] Assignee: Fujitsu Limited, Kawasaki, Japan

[21] Appl. No.: 811,364

[22] Filed: Dec. 20, 1991

[30] Foreign Application Priority Data

Dec. 20, 1990 [JP] Japan .................................. 2-412332
May 15, 1991 [JP] Japan .................................. 3-110402
Sep. 30, 1991 [JP] Japan .................................. 3-251210

[51] Int. Cl.⁵ ....................... G01N 29/06; A61B 8/08
[52] U.S. Cl. .................................. 73/626; 128/660.08; 128/661.01
[58] Field of Search .................. 73/626, 625, 628, 627, 73/609, 617; 128/660.06, 660.07, 660.08, 661.01, 916

[56] References Cited

U.S. PATENT DOCUMENTS

| | | | |
|---|---|---|---|
| 4,116,229 | 9/1978 | Pering | 73/626 |
| 4,217,909 | 8/1980 | Papadofrangakis et al. | 73/602 |
| 4,330,875 | 5/1982 | Tachita et al. | 73/626 |
| 4,528,854 | 7/1985 | Shimazaki | 73/626 |
| 4,632,124 | 12/1986 | Hiller et al. | 128/660 |
| 4,643,028 | 2/1987 | Kondo et al. | 73/625 |

FOREIGN PATENT DOCUMENTS

| | | |
|---|---|---|
| 0161587 | 11/1985 | European Pat. Off. . |
| 0222294 | 5/1987 | European Pat. Off. . |
| 0302554 | 2/1989 | European Pat. Off. . |
| 3634504 | 4/1987 | Germany . |
| 2137448 | 10/1984 | United Kingdom . |

*Primary Examiner*—Hezron E. Williams
*Assistant Examiner*—Rose M. Finley
*Attorney, Agent, or Firm*—Staas & Halsey

[57] ABSTRACT

An acoustic imaging system includes pairs of variable gain amplifiers for deriving essentially pairs of signals from respective signals generated in respective ultrasonic vibrators and the pairs of signals are superimposed on each other in a time difference corresponding to a phase angle of $\pi/2$ in frequency of ultrasonic waves. Amplification factors of the variable gain amplifiers are controlled so that the desired phase shift of the superimposed signals is obtained to attain dynamic focusing. Another acoustic imaging system includes a switch circuit having a two stage matrix switches construction that performs matrix switch functions in a smaller number of switch elements. Still another acoustic imaging system includes constituents for the aforementioned phase control for fine adjustment of delay time, the aforementioned switch circuit for rough adjustment of delay time, and variable gain amplifiers that perform smooth switching of the delay time.

7 Claims, 27 Drawing Sheets

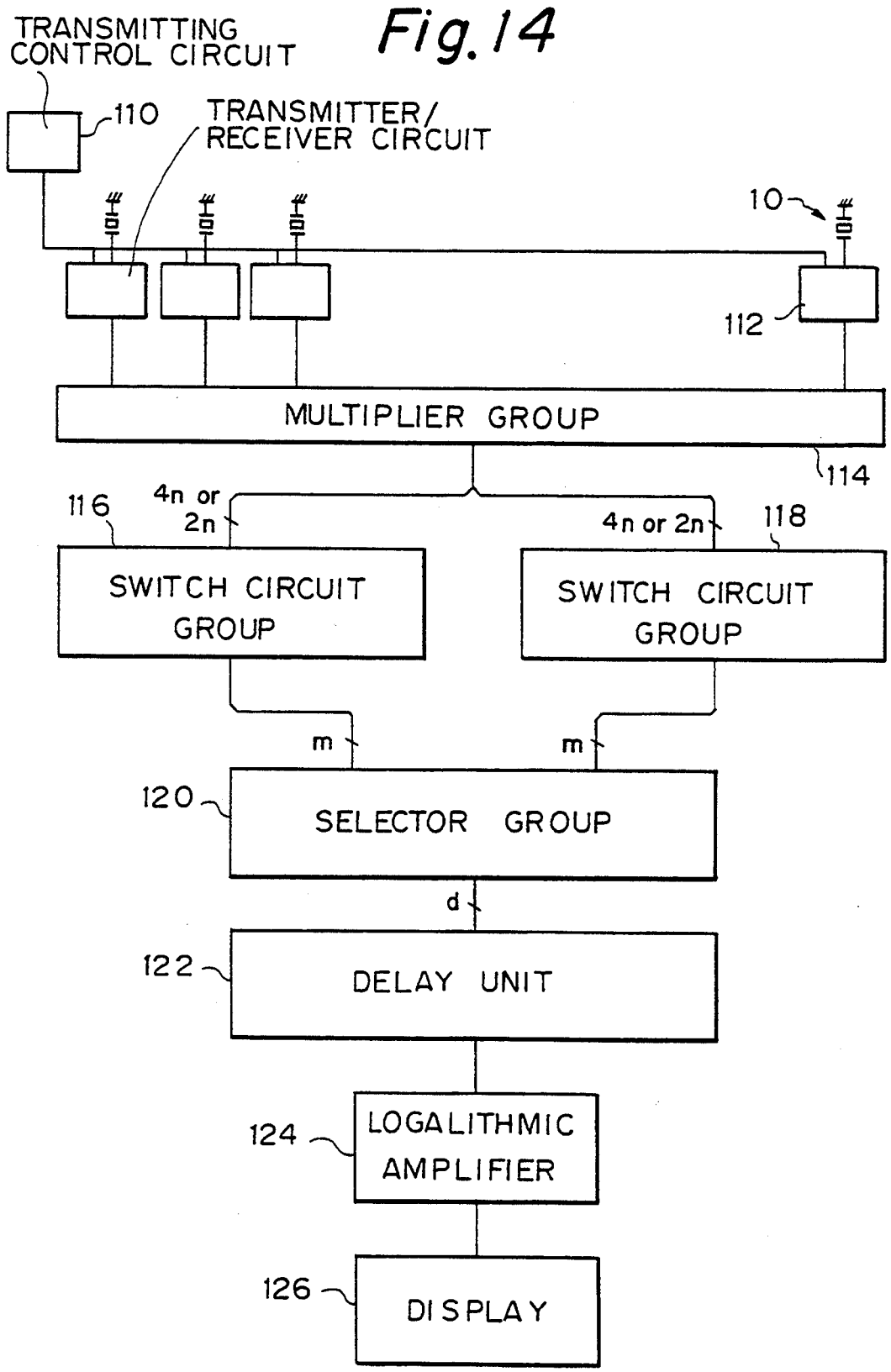

Fig. 17A
Fig. 17B
$B_S = \sin(\phi)$
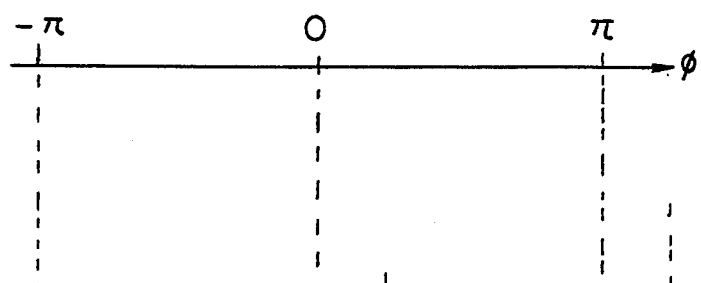
Fig. 17C
$B_C = \cos(\phi)$
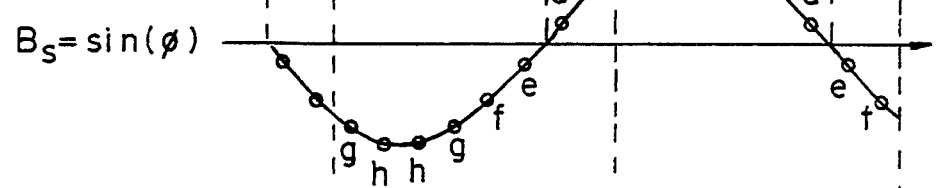
Fig. 17D
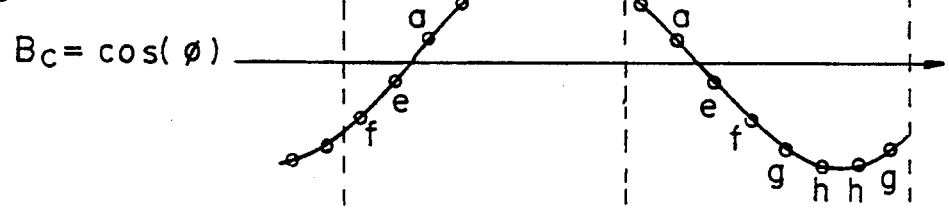

ACOUSTIC IMAGING SYSTEM

BACKGROUND OF THE INVENTION

1. Field of the Invention

The present invention, relates to an acoustic imaging system, more particularly, an acoustic imaging system for producing real time images of internal portions of an object both in sector scan mode and in linear scan mode.

The acoustic imaging system is utilized, for example, as an ultrasonic diagnostic apparatus for producing real time cross-sectional images of the human body, and a defect detecting apparatus for detecting material or structural defects of an object.

2. Description of the Related Art

In an acoustic imaging system, a plurality of transducer elements, i.e., ultrasonic vibrators are placed in contact with an object, and ultrasonic waves are generated in the transducers so as to form a beam penetrating the object. Reflected waves are converted into corresponding electrical signals in the transducers. A focus point is established by controlling the delay time of individual electrical signals so as to compensate for path differences between the focus point and the individual transducers and by superimposing the signals.

To obtain real time images of the object, dynamic focusing, i.e., frequent change of values of the delay time to move the focus point must be attained. If the change of the delay time is implemented by switching switch elements, spike noises are generated in every switching, so that the obtained images are contaminated by the spike noises.

Japanese Unexamined Patent Publication (Kokai) No. 56-112234 discloses an ultrasonic imaging system comprising two systems of tap-switching type phased arrays including a plurality of switch elements and delay lines having a plurality of taps. The two systems of phased arrays are alternatively used to avoid invasion of spike noises when switching. The imaging apparatus disclosed in the above publication requires two systems of expensive phased arrays, and since whole phased arrays having a long delay time are alternatively used, the frequency of the switching is limited to a certain level.

U.S. Pat. No. 4,140,022 discloses a sector scan type acoustic imaging system comprising a plurality of phase changing means coupled to the phase control means to effect the dynamic focusing. The phase changing means preferably includes a mixer, a source of waves of a given frequency, and means for setting the phase of the waves coupled from the source to the mixer.

Since the ultrasonic imaging system disclosed in the above publication includes mixers, oscillators, and phase shifters, the whole system becomes expensive and complex, and in particular, in a linear scan type imaging apparatus wherein many signals have to be processed, these shortcomings become serious problems.

Furthermore, since the dynamic focusing is attained only by controlling the phase of carrier signals included in the received signals, in a recently required probe having a large imaging area wherein phase variation more than three times as large as the wavelength of the ultrasonic signals is required in the dynamic focusing, deterioration of the ultrasonic beams occurs in the region where large phase variation is required in dynamic focusing. The reason why the deterioration of the ultrasonic beams occurs is that focusing becomes imperfect in that region, because a central frequency of the frequency distribution of the ultrasonic wave shifts toward the lower side because of attenuation in a higher frequency component in the living body. Since magnitudes of the frequency shifts are different in individual human bodies, the frequency shift cannot be adequately compensated for. It is also the reason why only the phase of the carrier signals is adjusted by the phase control, but envelopes of the signals are not adjusted by the phase control.

The deterioration of the ultrasonic beams might be avoided by performing complex processes wherein a single scan is divided into a plurality of steps in a depth direction, and dynamic focusing is carried out for the respective steps, with the results synthesized into a single scan line. However, these processes require a long processing time to obtain a cross-sectional image, and therefore, reality of time, which is an essential purpose of the dynamic focusing, is lost. In addition, division into a few steps in a depth direction is not enough to avoid the deterioration of the beams.

To realize the linear scan mode, parts of the vibrators have to be selected by multiplexers according to positions of the scan line as disclosed in U.S. Pat. Nos. 4,224,829 and 4,699,009. Nevertheless, the linear scan and the dynamic focusing could be simultaneously realized by N variable gain amplifiers for performing dynamic apodizing and an N:M switch matrix where N is a number of the vibrators and M is a number of input taps of a delay line as described with reference to drawings later, if the problems of the spike noises are to be resolved and if the numbers N and M are not so large. However, in recent years, imaging systems having high resolution have been required, as ultrasonic diagnostic systems have been widely used. In order to realize a higher resolution, the number of transducer elements N must be large. For example, an apparatus wherein N=2128 has been manufactured. Also, resolution of the delay time in the delay line must be refined to realize a high resolution. To refine the resolution of the delay time, the number of the input taps of the delay line M must be large. For example, M is required to be up to 128.

As mentioned above, the imaging system having a higher resolution requires the larger number of N and M, and therefore a switch matrix having a great many switch elements is required. For example, if N=128 and M=128, then the number of switch elements becomes $128 \times 128 = 16,384$. In order to realize this, if commercially available matrix switch IC's of 8:16 are used, $(128 \times 128)/(8 \times 16) = 128$ of IC's are required, and it is not practical to use the same.

SUMMARY OF THE INVENTION

It is an object of the present invention to provide an acoustic imaging system that can produce a real time image not contaminated by switching noises.

It is another object of the present invention to provide an acoustic imaging system comprising a low-priced phase controlling means to effect dynamic focusing.

It is still another object of the present invention to provide a switch circuit for use in an acoustic imaging system having a larger imaging area and a higher resolution.

It is still another object of the present invention to provide an acoustic imaging system that can produce real time images over a wide range and not be affected by attenuation due to an object even though a single expensive delay line is used.

In accordance with the present invention, there is provided an acoustic imaging system for producing images of internal portions of an object comprising:

a plurality of transducers for respectively generating acoustic waves so as to form an acoustic beam penetrating the object and for respectively converting reflected waves into corresponding electric signals;

a plurality of first multiplication means for multiplying values of the electric signals output from the respective transducers by first real numbers, respectively;

a plurality of second multiplication means for multiplying values of the electric signals output from the respective transducers by second real numbers, respectively;

a delay means having a plurality of input terminals for delaying signals input from the respective input terminals in different values of delay time from each other and for superimposing the delayed signals on each other;

a first switch means for connecting outputs of the first multiplication means to the input terminals of the delay means so that the signals output from the first multiplication means are superimposed on each other in time differences so as to compensate arrival time differences of the reflected waves from a focus point at a reference position in the internal portions of the object, in the delay means;

a second switch means for connecting outputs of the second multiplication means to the input terminals of the delay means so that each output signal of the second multiplication means is superimposed in a predetermined time difference on a signal that originates in the same transducer and that is output from the first multiplication means, in the delay means; and a control means for providing first and second real numbers for the respective first and second multiplication means to shift a phase of carrier signals contained in signals formed by superimposing pairs of signals originating in the same transducers to thereby move the focus point from the reference position to a desired position.

In accordance with the present invention, there is also provided a switch circuit for connecting transducers to desired input terminals of a delay unit in an acoustic imaging system comprising:

a first switch means including a plurality of matrix switches each having a plurality of input lines, a plurality of output lines each intersecting all of the input lines, and a plurality of switch elements located in all of the intersection points of the input lines and the output lines;

a second switch means including a plurality of matrix switches each having a plurality of input lines, a plurality of output lines each intersecting all of the input lines, and a plurality of switch elements located in all of the intersection points of the input lines and the output lines;

a first connection means for connecting the transducers to the input lines of the matrix switches of the first switch means;

a second connection means for connecting the output lines of the matrix switches of the first switch means to the input lines of the matrix switches of the second switch means; and a third connection means for connecting the output lines of the matrix switches of the second switch means to the input terminals of the delay unit.

In accordance with the present invention there is also provided an acoustic imaging system for producing images of internal portions of an object comprising:

a plurality of transducers for respectively generating acoustic waves so as to form an acoustic beam penetrating the object and respectively converting reflected waves into corresponding electric signals;

a multiplication means for deriving at least two signals having different gain and/or polarity from each other from each electric signals output from each transducer;

a delay means having a plurality of input terminals for delaying signals input from the respective input terminals with different values of delay time and for superimposing the delayed signals on each other;

a first switch means, for connecting the multiplication means to the delay means so that pairs of signals originating in the same transducer and having different gain and/or polarity are superimposed on each other in a predetermined time difference and signals originating in different transducers are superimposed on each other in time differences so as to roughly compensate for arrival time differences of the reflected waves from a desired focus point in the internal portions of the object, in the delay means;

a second switch means, for connecting the multiplication means to the delay means so that pairs of signals originating in the same transducer and having different gain and/or polarity are superimposed on each other in a predetermined time difference and signals originating in different transducers are superimposed on each other in time differences so as to roughly compensate for the arrival time differences, in the delay means;

a selector means inserted between the first and second switch means and the delay means for selectively connecting the first or the second switch means to the delay means; and control means for changing the connection in one of the first and the second switch means that is not selected by the selector means to another connection corresponding to next desired focus point and for setting the gain and/or polarity of the multiplication means so as to finely compensate for the arrival time differences.

BRIEF DESCRIPTION OF THE DRAWINGS

FIG. 14 is a block diagram showing a general construction of an acoustic imaging system according to a third embodiment of the present invention;

FIGS. 17A to 17D are diagrams explaining the generation of signals $B_s$ and $B_c$ for the phase control;

DESCRIPTION OF THE PREFERRED EMBODIMENT

Figure 1:
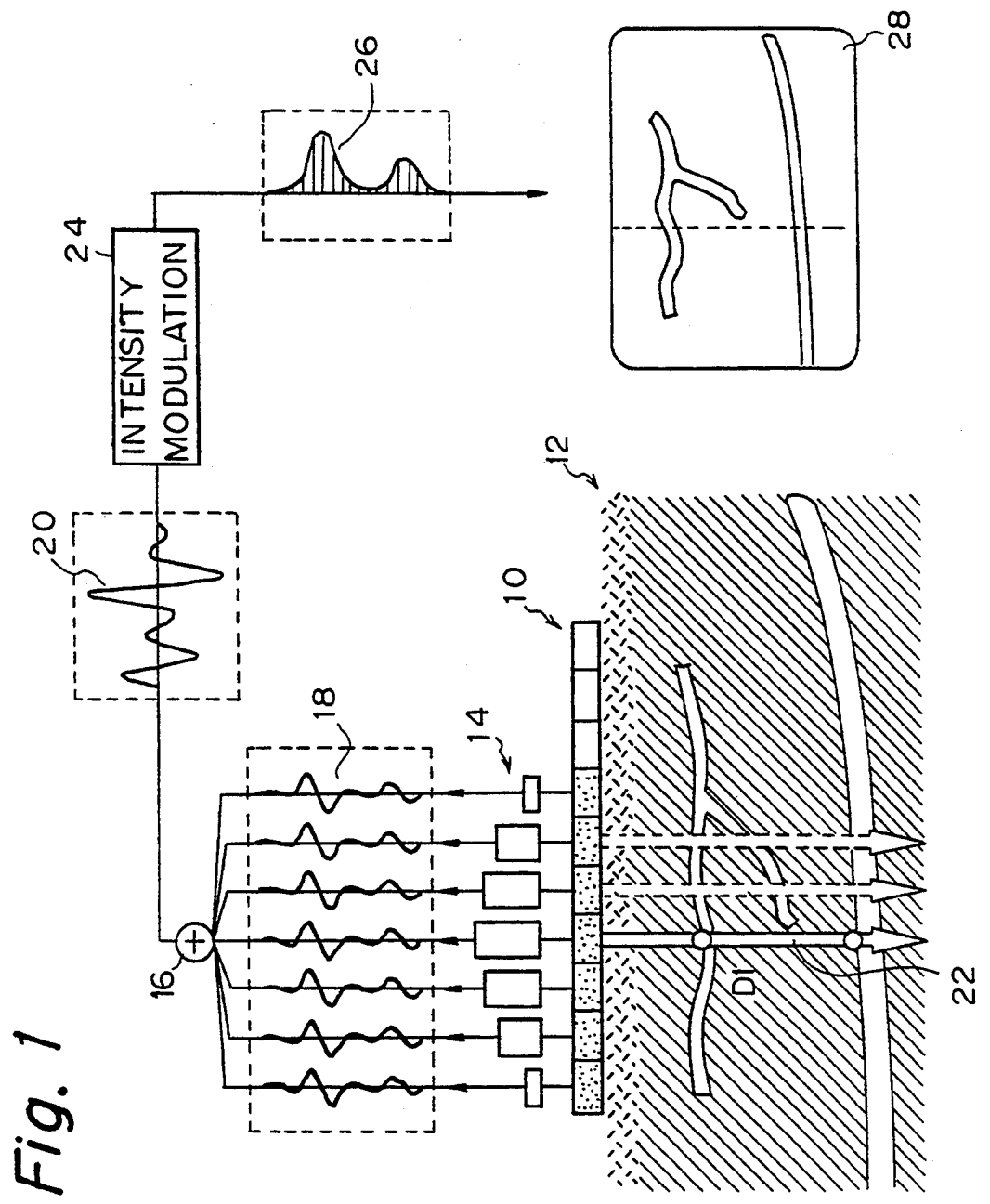
FIG. 1 is a diagram explaining a principle of ultrasonic imaging in a linear scan mode.

FIG. 1 is a diagram explaining a principle of ultrasonic imaging in a linear scan mode. In FIG. 1, ultrasonic waves are generated in an array of ultrasonic vibrators 10 so as to form a beam penetrating an object in a direction of a scan line. Waves reflected at the point D1 return to the ultrasonic vibrators 10. Since the distances between the point D1 and the vibrators 10 are different in the respective vibrators 10, arrival time of the reflecting wave is different in the respective vibrators 10.

Therefore, in delay lines 14, an electric signal generated in a vibrator closest to D1 (central vibrator among the smudged vibrators) is given a larger delay time, and electric signals generated in vibrators farthest from D1 are given smaller delay times, so that the signals become equiphase at a summing point 16. The waveforms 18 represent signals given the above delay times, and the waveform 20 represents the result of summation in the summing point 16. As the focussing point D1 is moved on an arrow 22, namely, the delay time in the delay lines 14 is varied according to the movement; the intensity of an envelope of the waveform 20 is varied in response to the acoustic characteristics at the focus. The intensity of the envelope is detected and intensity modulation is applied thereto in block 24, to obtain an image signal 26 on a single scan line. In practice, a pulsed ultrasonic beam is applied at the respective focus points. By repeating the above scanning processes on given scan lines, real time images 28 of the internal portions of the object 12 are obtained.

Figure 2:
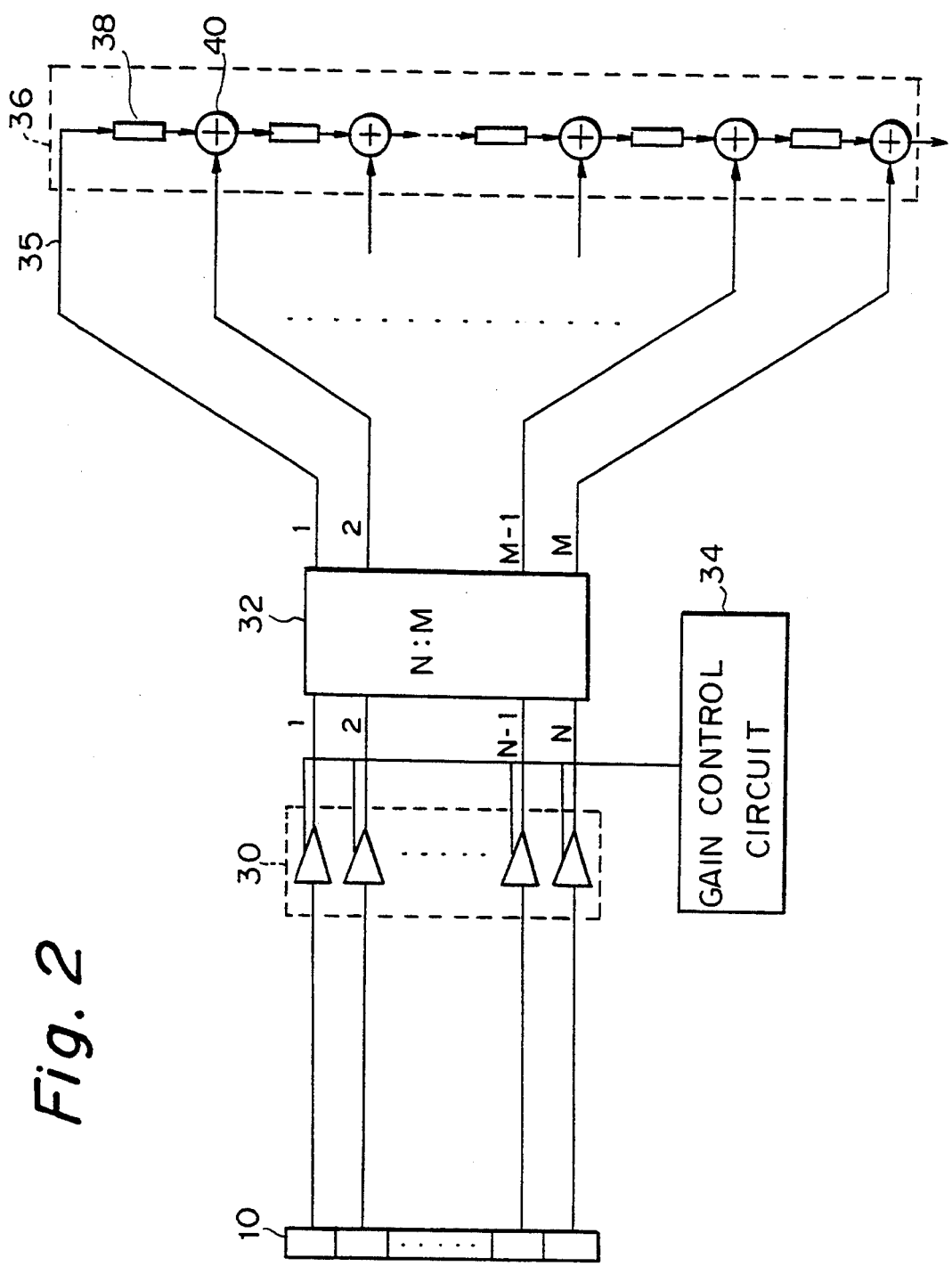
FIG. 2 is a general circuit diagram showing the construction of an acoustic imaging system.

Functions of parts from the ultrasonic vibrators 10 to the summing point 16 in FIG. 1 is realized by a receiver section having a construction shown in FIG. 2.

In FIG. 2, the electric signals generated in ultrasonic vibrators 10 are amplified in respective variable gain amplifiers 30 and are input in current signal form to an N:M switch matrix 32 having N input lines, M output lines and N×M switch elements provided in every intersection point of the input lines and output lines. Amplification factors of the amplifiers 30 are controlled by a gain control circuit 34 so that the signals are apodized, for example, in a Gaussian curve located according to a position of the scan line to effect dynamic apodizing. The M output lines of the switched matrix 32 are connected to respective M input taps 35 of a delay line 36. The delay line 36 has serially connected M−1 small delay elements 38 and M−1 summing points 40 located thereafter respectively for superimposing input signals from the input taps 35 on the output signal of the respective small delay elements 38 to supply the results to the following small delay elements or output of the delay line 36, respectively, as shown in FIG. 2. A signal input from one of the input taps 35 is delayed by all of the small delay elements positioned downstream of the corresponding summing point, and other signals input from other input taps are similarly delayed by the respective numbers of small delay elements. Therefore, the input signals are delayed by respective delay time according to the respective positions of the input taps and are summed up.

The switch elements (shown in FIG. 5 later) of the switch matrix 32 are controlled so that the respective input lines are connected to the input taps 35 corresponding to values of delay time determined in accordance with a depth of the focus and the position of the scan line. When a plurality of input lines are connected to a common input tap, the current signals input from these input lines are summed up and are given the same delay time.

Figure 3:
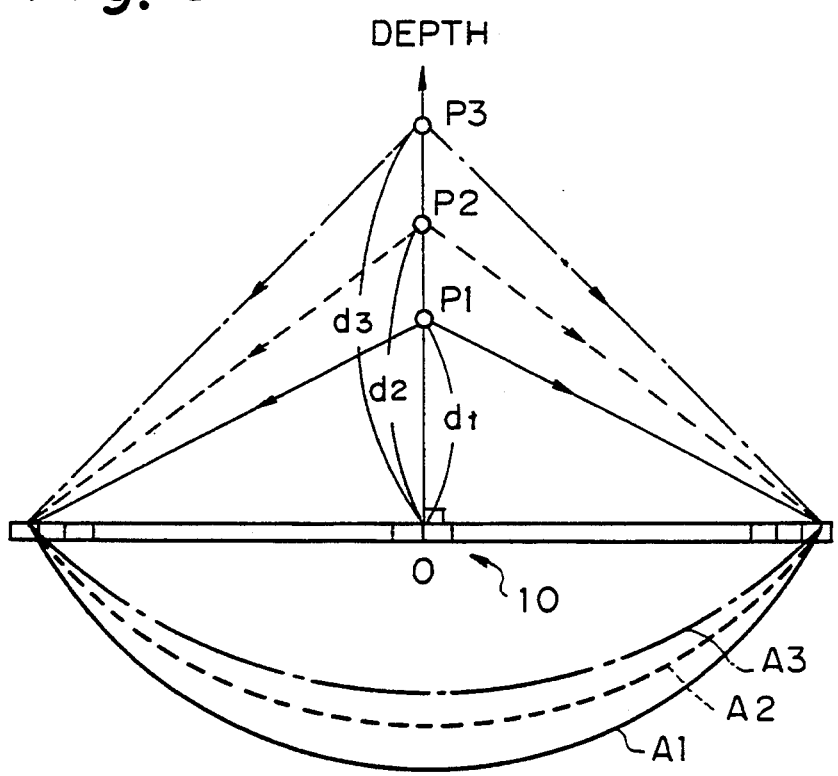
FIG. 3 is a diagram showing wave fronts of reflected waves from three focus points in different depths.

FIG. 3 shows reflected ultrasonic waves from focus points P1, P2 and P3 at depths of d1, d2 and d3, respectively. Assuming homogeneous medium in an object, wave fronts of the reflected waves from P1, P2 and P3 at a moment of arrival at both end elements of the vibrators 10 are as shown by A1, A2 and A3, respectively. Therefore, the distribution of delay time required for elements become circular arcs D1, D2 and D3 shown in FIG. 4.

Figure 5:
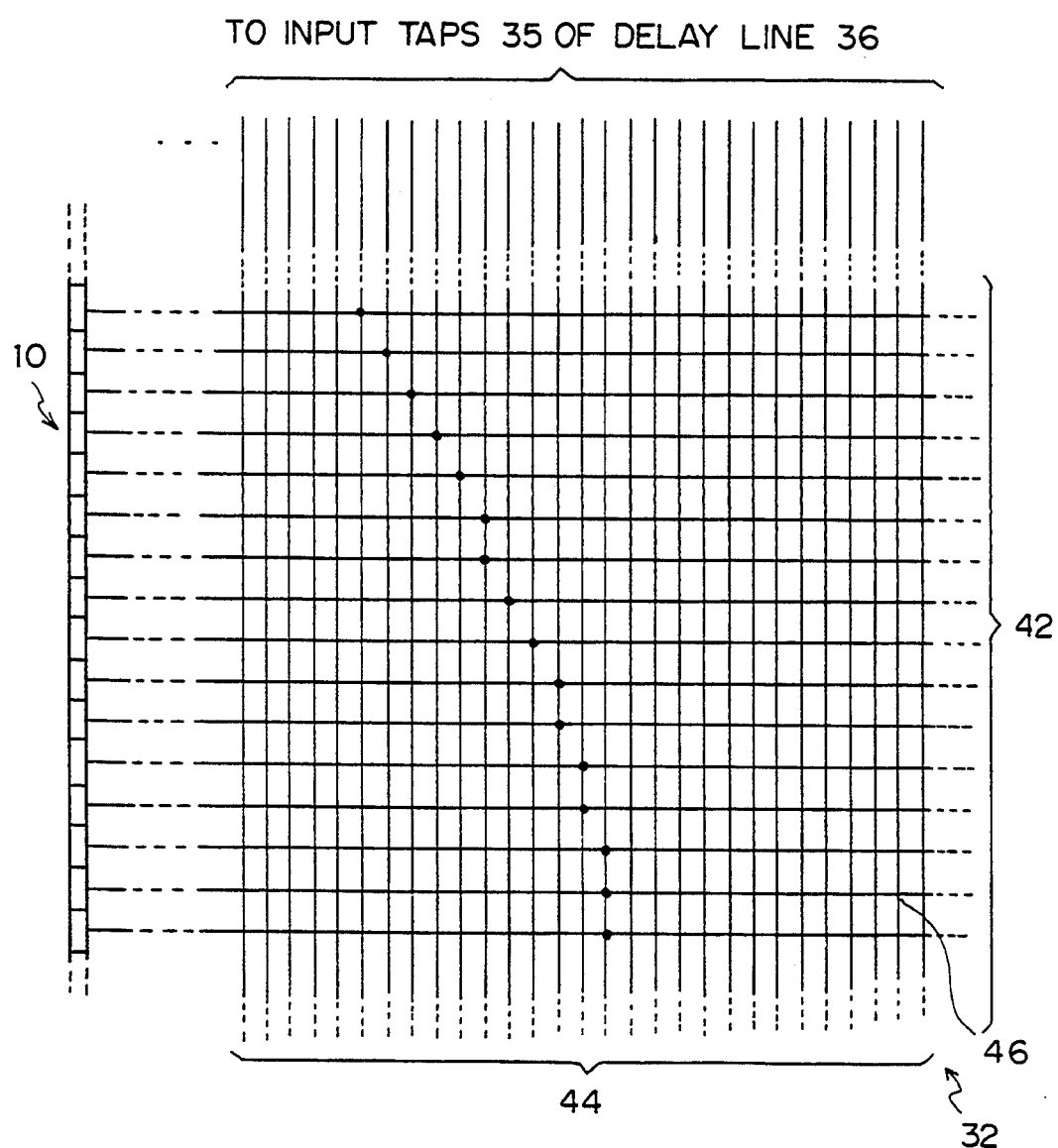
FIG. 5 is a diagram showing a part of a switch matrix 32 shown in FIG. 2.

FIG. 5 shows a part of the switch matrix 32 having N input lines 42 and M output lines 44. The switch matrix 32 has N×M switch elements 46 at intersection points of the input lines 42 and output lines 44. To give the delay time distribution of one of circular arcs D1, D2 and D3, the switch elements denoted by black rounds in FIG. 5 are switched on and the other switch elements are switched off, as shown in FIG. 5. Thus, in the imaging system of FIG. 2, the dynamic focusing is attained by switching the switch elements 46 of the switch matrix 32.

Dynamic focusing by phase control

Figure 6:
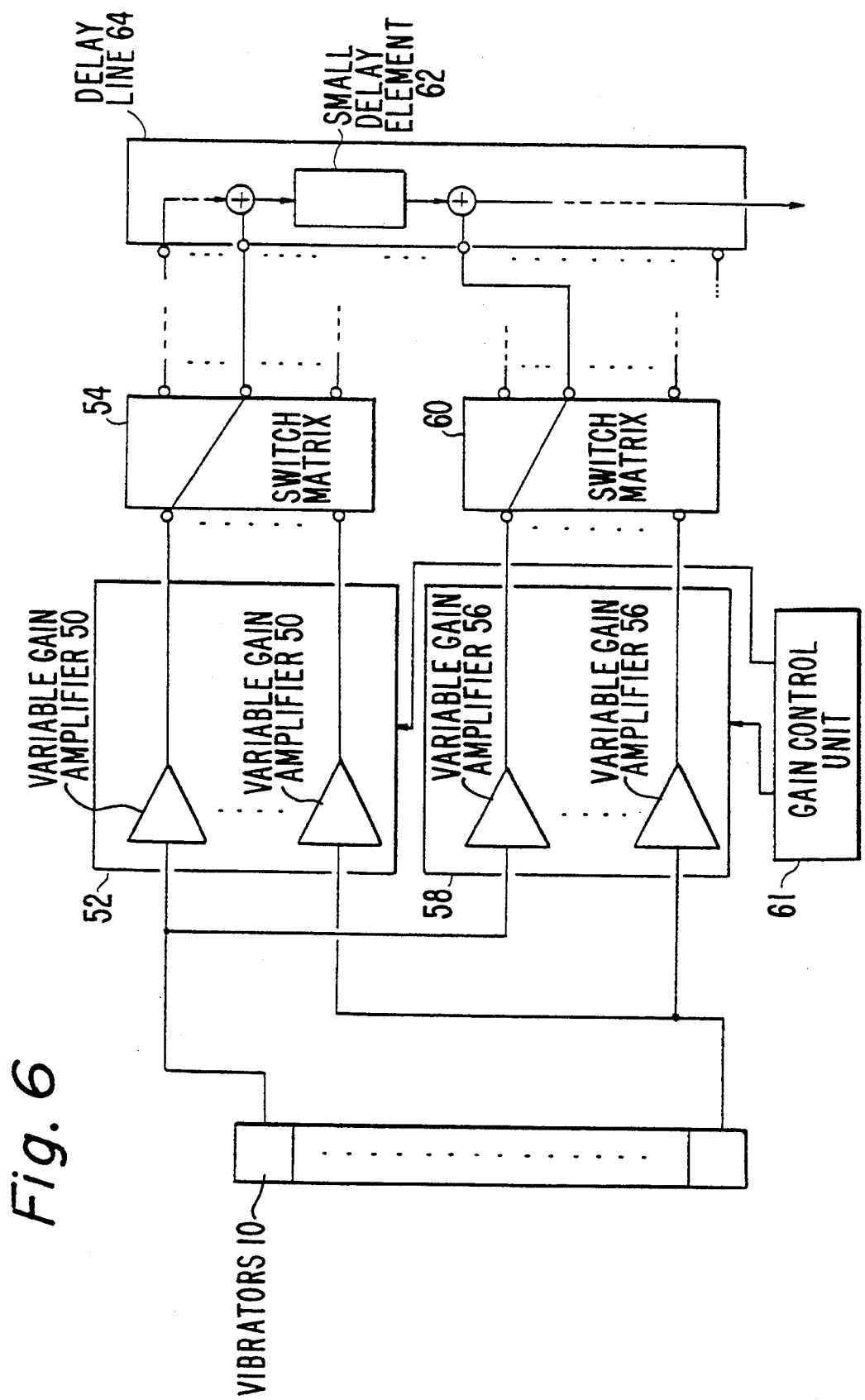
FIG. 6 is a general circuit diagram showing a basic construction of an acoustic imaging system according to a first embodiment of the present invention.

FIG. 6 is a diagram showing the basic construction of a receiver section for an acoustic imaging system according to a first embodiment of the present invention.

In FIG. 6, electric signals generated in the respective vibrators 10 are amplified in respective variable gain amplifiers 50 in a first variable gain amplifier group 52 and are input to a first switch matrix 54. The electric signals are also amplified in parallel in variable gain amplifiers 56 in a second variable gain amplifier group 58 and are input to a second switch matrix 60. Amplification factors in the amplifiers 50 and 56 are individually controlled by a gain control unit 61.

In this embodiment, connections in the first and the second switch matrix 54 and 60 are set so that each pair of signals generated in the same vibrator are supplied before and after a small delay element 62 having a predetermined delay time in a delay line 64. The dynamic focusing is attained by varying the amplification factors of pairs of variable gain amplifiers 50 and 56 by the gain control unit 61.

Figure 7:
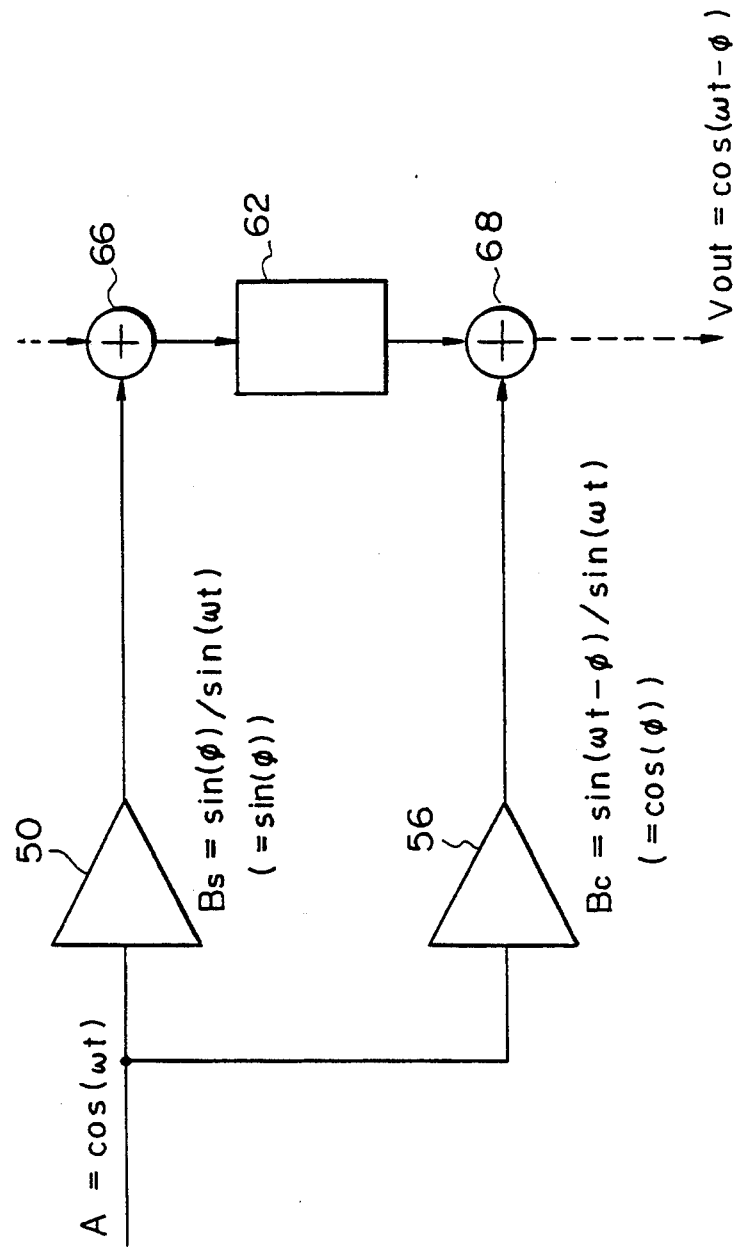
FIG. 7 is a diagram for explaining an operation of phase control in the acoustic imaging system of FIG. 6.

FIG. 7 is a diagram for explaining the control of phase delay to attain the dynamic focusing in the first embodiment of the present invention. In FIG. 7, one of the variable gain amplifiers 56 is amplifying the same signal as the amplifier 50, one of the small delay elements 62 is giving the phase difference between output signals of the two amplifiers 50 and 56, and two summing points 66 and 68 located before and after the small delay elements 62, are shown.

In FIG. 7, approximating the signals input to the amplifiers 50 and 56 as $$A = \cos(\omega t) \quad (1),$$

representing amplification factors of the amplifiers 50 and 56 as $B_s$ and $B_c$, respectively, and representing a value of the delay time in the small delay element 62 as $\tau$, a signal $V_{out}$ in the summing point 68 is written as $$V_{out} = B_s \cos\{\omega(t - \tau)\} + B_c \cos(\omega t) \quad (2)$$
$$= B_s \{\cos(\omega t)\cos(\omega\tau) + \sin(\omega t)\sin(\omega\tau)\} + B_c \cos(\omega t) \quad (3)$$

Using a parameter $\phi$, wherein $$\cos(\phi) = B_s \cos(\omega\tau) + B_c \quad (4)$$

and $$\sin(\phi) = B_s \sin(\omega\tau) \quad (5),$$

the amplification factors $B_s$ and $B_c$ are written as $$B_s = \sin(\phi)/\sin(\omega\tau) \quad (6)$$

-continued
$$B_c = \cos(\phi) - \sin(\phi)\cos(\omega\tau)/\sin(\omega\tau) \quad (7)$$
$$= \{\sin(\omega\tau)\cos(\phi) - \sin(\phi)\cos(\omega\tau)\}/\sin(\omega\tau) \quad (8)$$
$$= \sin(\omega\tau - \phi)/\sin(\omega\tau), \quad (9)$$

where
$$\sin(\omega\tau) \neq 0, \quad (10)$$
i.e.,
$$\omega\tau = 2\pi f\tau \neq k\pi \quad (11)$$
$$\therefore \tau \neq k/2f, \quad (12)$$

where f is central frequency of the received signal and k is an integer.

Substituting (6) and (8) into (3), $$V_{out} = \cos(\phi)\cos(\omega\tau) + \sin(\phi)\sin(\omega\tau) \quad (13)$$
$$= \cos(\omega\tau - \phi) \quad (14)$$

are obtained.

The formula (14) indicates that if the delay time $\tau$ and the central frequency f of the input signals are known and if the condition (12) is satisfied, the phase of the output signals can be controlled by setting the amplification factors of the amplifiers 50 and 56 to $B_s$ and $B_c$, respectively, which have been calculated according to the formulae (6) and (9).

Especially, if $\tau = 1/4f$, $\omega\tau = 2\pi f/4f = \pi/2$, then the formulae (6) and (9) become $$B_s = \sin(\phi) \quad (15)$$

and $$B_c = \cos(\phi) \quad (16)$$

When $B_s = 1$ and $B_c = 0$, the construction shown in FIG. 6 is reduced to that of FIG. 2, and therefore, it is realized that fixed focuses can be set by selecting connections in the switch matrix 54. Connections in the switch matrix 60 are selected so that each pair of signals generated in the same vibrator are given a phase difference $\tau$ from each other as described before. After setting the fixed focus in A=1 and B=0, the dynamic focusing is attained by controlling the amplification factors $B_s$ and $B_c$ of the variable gain amplifiers 50 and 56 by the gain control unit 62 in accordance with the formulae (6) and (9) or (15) and (16).

In the first embodiment of the present invention, movement of the focus to the point separated from the fixed focus such that a phase shift corresponding to one or two cycles of the carrier frequency is required can be attained by varying the amplification factors of the variable gain amplifiers.

Figure 8:
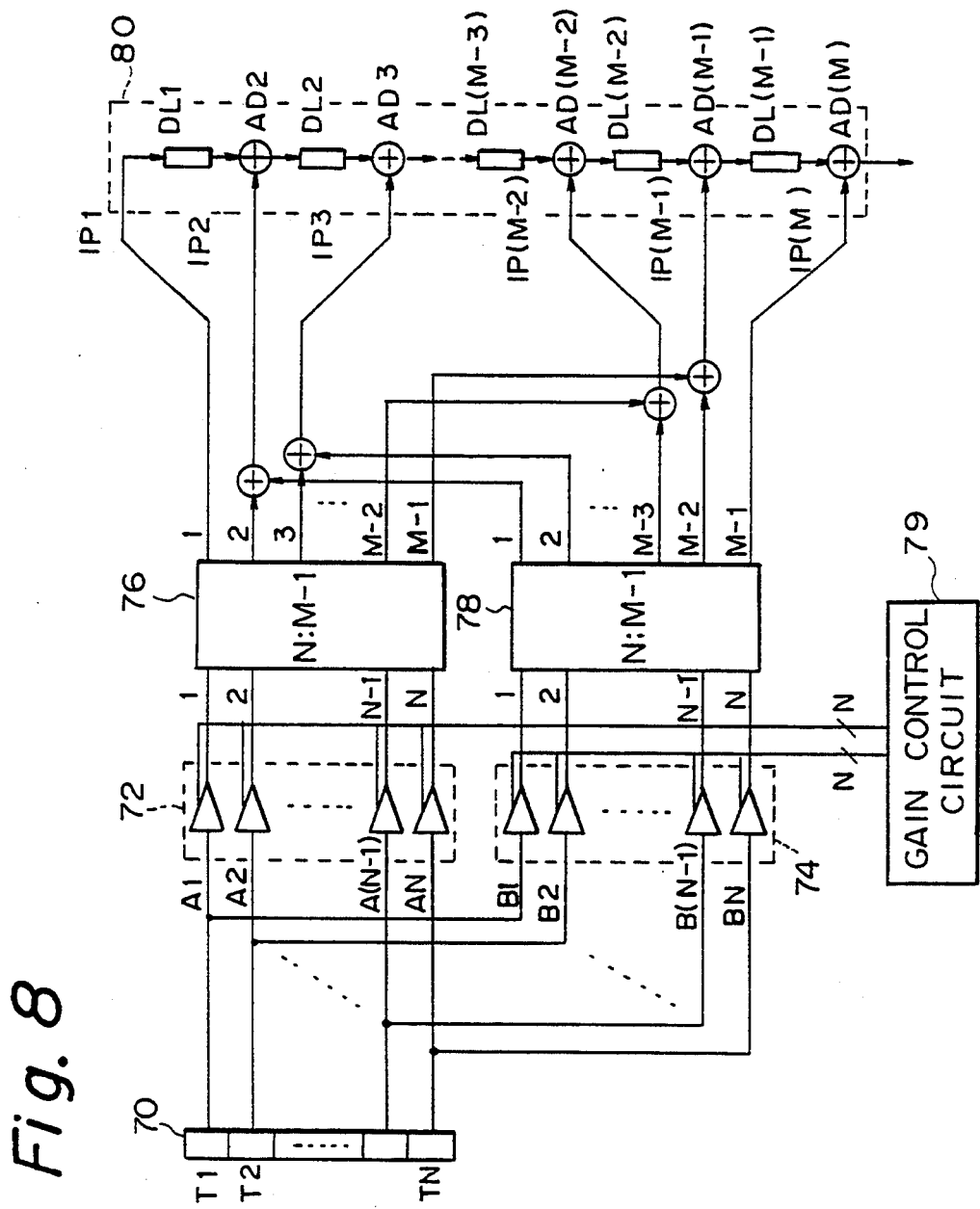
FIG. 8 is a circuit diagram showing a first example of a more practical construction of the acoustic imaging system of FIG. 6.

FIG. 8 is a diagram showing a first example of a more practical construction of the receiver section for the ultrasonic imaging system according to the first embodiment of the present invention.

In FIG. 8, the receiver section comprises a vibrator group 70 including N vibrators T1 to TN, a first variable gain amplifier group 72 including N variable gain amplifiers A1 to AN connected to the respective vibrators T1 to TN of the vibrator group 70, a second variable gain amplifier group 74 including N variable gain amplifiers B1 to BN connected in parallel to the amplifiers A1 to AN, a first and a second switch matrix 76 and 78 including N input lines, M−1 output lines, and N×(M−1) switch elements (not shown) at intersection points of the input lines and output lines, a gain control circuit 79, and a delay line 80 including M input taps IP1 to IP(M), M−1 small delay elements DL1 to DL(M−1), and M−1 summing points AD2 to AD(M).

Electric signals generated in the vibrators T1 to TN are branched into two systems. The signals in one system are amplified in respective variable gain amplifiers A1 to AN of the first variable gain amplifier group 72, and are supplied through the first switch matrix 76 having N input lines and (M−1) output lines to the input taps IP1 to IP(M−1) of the delay line 80. The signals in another system are amplified in respective variable gain amplifiers B1 to BN of the second variable gain amplifier group 74, and are supplied through the second switch matrix 78 to the input taps IP2 to IP(M) of the delay line 80.

As shown in FIG. 8, the first output line of the switch matrix 76 is connected to the input tap IP1 of the delay line 80, the i-th output line of the switch matrix 76 and the (i−1)-th output line of the switch matrix 78 are connected to the input tap IP(i) of the delay line 80 where i=2 to (M−1), and the (M−1)-th output line of the switch matrix 78 is connected to the input tap IP(M). In the delay line 80, the input tap IP1 is connected to an input of the small delay element DL1, the input tap IP(i) and an output of the small delay element DL(i−1) are connected to two inputs of the summing point AD(i) where i=2 to M, an output of the summing point AD(i) is connected to an input of the small delay element DL(i) where i=2 to M−1, and an output of the summing point AD(M) is an output of the delay line 80.

When a connection pattern is selected in the switch matrix 76 to set a fixed focus, the same connection pattern is selected in the switch matrix 78. Then, if the output of the i-th variable gain amplifier A(i) of the first group 72 is connected through the first switch matrix 76 to the j-th input tap IP(j) of the delay line 80, the output of the i-th variable gain amplifier B(i) of the second group 74 is connected through the second switch matrix 78 to the (j+i)-th input tap IP(j+1) of the delay line 80. Therefore, when delay time of the j-th small delay element DL(j) is $\tau(=k/2f)$, upon setting the amplification factors of the amplifier A(i) and B(i) to $G(i)\sin(\omega\tau-\phi_i)/\sin(\omega\tau)$ and $G(i)\sin(\phi_i)/\sin(\omega\tau)$, respectively, dynamic focusing is performed by varying the amplification factors of A(i) and B(i) according to the required $\phi_i$. The G(i) may be a Gaussian distribution to perform the apodizing as described before.

Especially, if $\tau=1/(4f)$, the amplification factors to be set for the A(i) and B(i) become $G(i)\sin(\phi_i)$ and $G(i)\cos(\phi_i)$, respectively.

Figure 9:
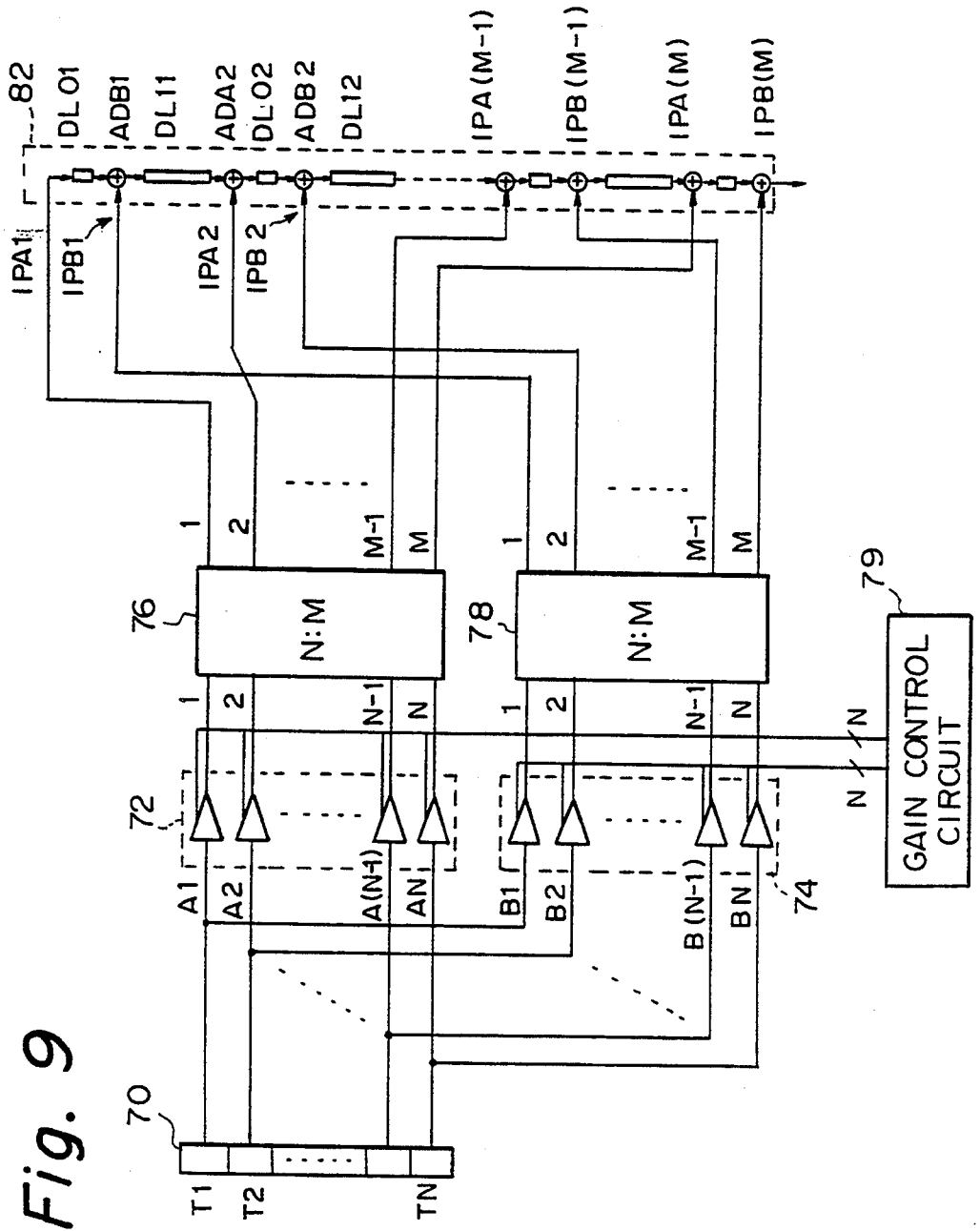
FIG. 9 is a circuit diagram showing a second example of a more practical construction of the acoustic imaging system of FIG. 6.

FIG. 9 is a diagram showing a second example of a more practical construction of the receiving section for the ultrasonic imaging apparatus according to the first embodiment of the present invention.

In this example, a first and a second variable gain amplifier group 72 and 74, a first and a second switch matrix 76 and 78, and a gain control circuit 79 are similar to those of FIG. 8. A delay line 82 has M input taps IPA1 to IPA(M), M input taps IPB1 to IPB(M), M small delay elements DL01 to DL0(M), (M−1) small delay elements DL11 to DL1(M−1), (M−1) summing points ADA2 to ADA(M), and M summing points ADB1 to ADB(M).

As shown in FIG. 9, the signal output from the i-th output line of the first switch matrix 76 is supplied through the input tap IPA(i) to the input of the small delay element DL0(i) where i=1 to M, the signal output from the i-th output line of the second switch matrix 78 is added through the input tap IPB(i) to the signal output from the small delay element DL0(i) when i=1 to M. Therefore, if a connection pattern in the first switch matrix 76 is the same as that of the second switch matrix 78, the signal amplified in the variable gain amplifier A(i) is delayed by the small delay element DL0(i) and is superimposed on the signal amplified in the variable gain amplifier B(i) where i=1 to M. Thus, the dynamic focusing is performed in the same process as described in the first example of FIG. 8.

If delay times of the small delay elements DL0(i) and DL1(i) are represented as $\tau 0$ and $\tau 1$, respectively, a delay time $\tau 0+\tau 1$ caused by serially connected two small delay elements DL0(i) and DL1(i), is given between two signals output from adjacent output lines of the switch matrix 76 or 78. Therefore, a unit delay time to set the fixed focus is that delay time $\tau 1+\tau 0$. Time corresponding to one period of the carrier frequency (1/f) can be used as the $\tau 0+\tau 1$, because fine values of delay time to set the fixed point is not necessary in this embodiment. In comparison with the conventional system wherein $\tau \leq (8f)$ is required, the switch matrix having output lines of the smaller number M can be used in this embodiment, when the total delay time of the delay line 82 is the same.

Figure 10:
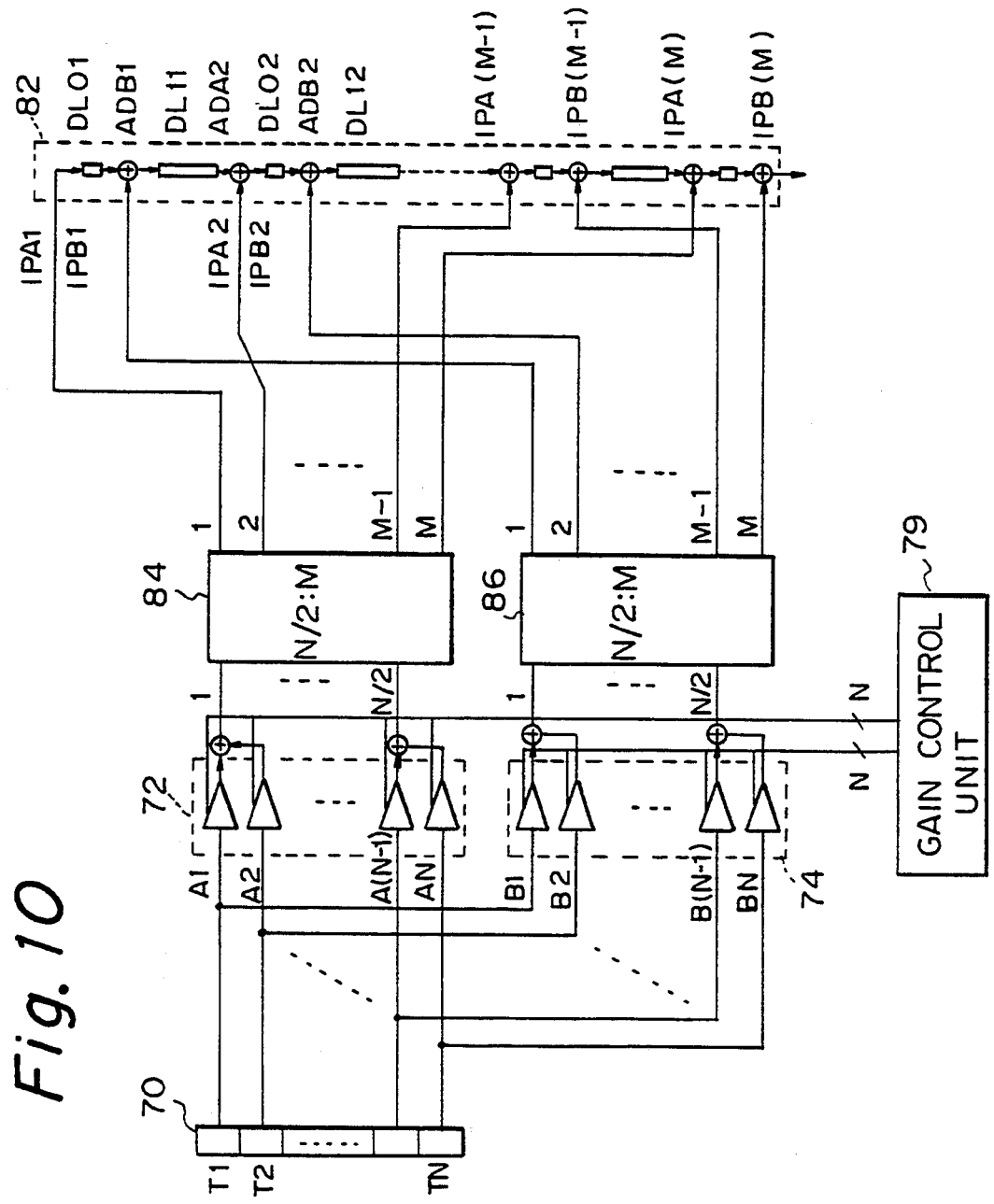
FIG. 10 is a circuit diagram showing a third example of a more practical construction of the acoustic imaging system of FIG. 6.

FIG. 10 is a diagram showing a third example of a more practical construction of the receiver section for the ultrasonic imaging system according to the first embodiment of the present invention.

In this example, the delay line 82 and the connection between the output lines of the switch matrix and the input taps of the delay line is the same as that of FIG. 9. Also, that of FIG. 8 may be alternatively used. The example in FIG. 8 or FIG. 9 is different in that a pair of signals generated in adjacent vibrators T(i) and T(i+1) where i=1, 3, 5 . . . are summed up at outputs of the variable gain amplifiers A(i) and A(i+1) or B(i) and B(i+1), and the number of input lines of the first and the second switch matrix 84, 86 is one half, i.e., N/2.

The reason is that the time difference between adjacent vibrators can be sufficiently compensated for only by controlling the amplification factors of the variable gain amplifiers since the time difference is small.

Switch circuit

As mentioned before, in the imaging system of FIG. 2 and also in FIG. 6, N×M switch elements are required to set values of delay time for individual transducers, and the number N×M of switch elements is not practical in recently required imaging systems having a large imaging area and high resolution.

Figure 11:
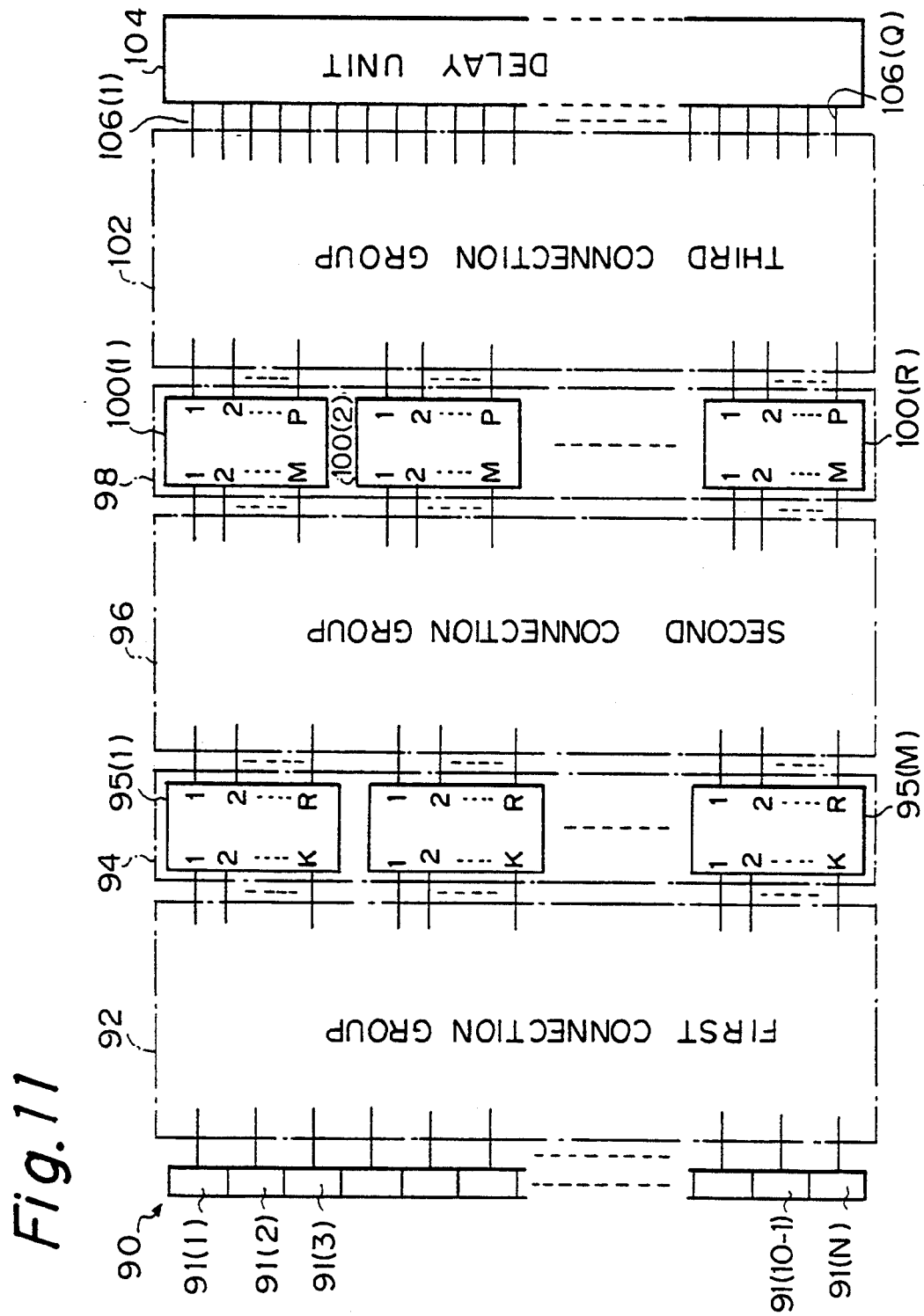
FIG. 11 is a general circuit diagram showing a basic construction of an acoustic imaging system according to a second embodiment of the present invention.

FIG. 11 shows a basic construction of a receiver section for an acoustic imaging system according to a second embodiment of the present invention wherein the above problem has been resolved.

Referring to FIG. 11, the receiver section comprises a vibrator group 90 including N vibrators 91(1) to 91(N), a first connection group 92, a first switch group 94 including M matrix switches 95(1) to 95(M) each having K input terminals and R output terminals, a second connection group 96, a second switch group 98 including R matrix switches 100(1) to 100(R) each having M input terminals and P output terminals, a third connection group 102, and a delay unit 104 having Q input terminals 106(1) to 106(Q), wherein $N \leq K \times M$ and $Q \leq P \times R$.

In the matrix switches, each input line intersects all of the output lines, and switch elements are provided in all of the intersection points for selectively connecting the input lines to the output lines.

The first connection group 92 connects the n-th vibrator 91(n) to one of the input terminals of the m-th matrix switch 95(m), wherein $n=1$ to $N$ and $m=[(n-1)/K]+1$, where $[x]$ represents an integer not greater than x.

The second connection group 96 connects the $R \times M$ output terminals of the matrix switch 95(1) to 95(M) to the $M \times R$ input terminals of the matrix switch 100(1) to 100(R), one to one, so that the respective output terminals of each matrix switch 95(1) to 95(M) are connected to one of the input terminals of the respective matrix switch 100(1) to 100(R).

The third connection group 102 connects the q-th input terminal 106(q) of the delay unit 104 to one of the output terminals of the r-th matrix switch 100(r), wherein $q=1$ to $Q$ and $r=(q-1)$ mode $R+1$, where A mode B represents a remainder after A is divided by B.

Switching operations in the first and the second switch group 94 and 98 are described in the case where a signal generated in an $n_0$-th vibrator 91($n_0$) is desired to be input to a $q_0$-th input terminal 106($q_0$) of the delay unit 104. The vibrator 91($n_0$) is connected through the first connection group 92 to one of the input terminals of an $m_0$-th matrix switch 95($m_0$) where $m_0=[(n_0-1)/K]+1$, and one of the output terminals of the $r_0$-th matrix switch 100($r_0$) is connected through the third connection group 102 to the input terminal 106($q_0$) where $r_0=(q_0-1)$ mode $R+1$. Therefore, by controlling the $m_0$-th matrix switch 95($m_0$) so that an input terminal connected through the first connection group 92 to the vibrator 91($n_0$) is connected to an output terminal connected through the second connection group 96 to the $r_0$-th matrix switch 100($r_0$), and by controlling the $r_0$-th matrix switch 100($r_0$) so that an input terminal connected through the second connection group 96 to the $m_0$-th matrix switch 95($m_0$) is connected to an output terminal connected through the third connection group 102 to the input terminal 106($q_0$), the signal generated in the $n_0$-th vibrator 91($n_0$) is input through the matrix switches 95($m_0$) and 100($r_0$) to the $q_0$-th input terminal 106($q_0$) of the delay unit 104.

Figure 4:
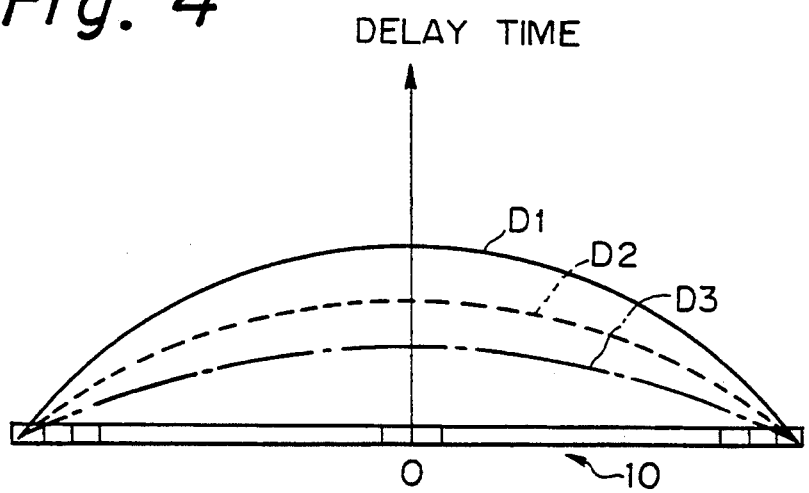
FIG. 4 is a diagram showing distributions of delay time required for signals in the three focus points.

It should be noted that connections between more than two vibrators and more than two input terminals 106 formed using a common single connection of the second connection group 96 must not be selected. For example, connections such that vibrators 91(1) and 91(2) are connected to input terminals 106(1) and 106(1+R), respectively, are inhibited because these connections are formed using a connection between a matrix switch 95(1) and a matrix switch 100(1) of the second connection group 96. However, these situations can be avoided by adequately selecting the values of K and R, because as shown in FIG. 4, the time differences required in K adjacent vibrators is limited to a certain level. If an R value corresponding to a time difference larger than that level is selected in the desired resolution of delay time, the above situations can be avoided.

Now, as an example, the case where $N=128$ and $Q=128$ is considered. If $K=16$, $R=16$, $M=8$ and $P=8$, eight matrix switches having sixteen input terminals and sixteen output terminals as matrix switches 95(1) to 95(M) and sixteen matrix switches having eight input terminal and eight output terminals as the matrix switches 100(1) to 100(R) realize functions of an $N \times Q=128 \times 128$ matrix switch shown in FIG. 2. The ratio number of switch elements, $(16 \times 16 \times 8+8 \times 8 \times 16)/(128 \times 128)$ is 0.19, namely, the number of switch elements becomes less than one fifth.

The matrix switches 95(1) to 95(M) constituting the first switch group 94 need not be M matrix switches physically independent on each other. For example, in the case where matrix switches having $K=8$ input terminals and $R=8$ output terminals are desired, two matrix switches may be implemented by a matrix switch having $K=16$ input terminals and $R=16$ output terminals. In contrast to this, a matrix switch having $K=16$ input terminals and $R=16$ output terminals may be implemented by two matrix switches having $K=8$ input terminals and $R=16$ output terminals. Also, a matrix switch having $K=12$ input terminals and $R=12$ output terminals may be, of course, used as a matrix switch having $K=8$ input terminals and $R=8$ output terminals wherein the other terminals are kept in none use. Similar discussions are allowed in the matrix switches 100(1) to 100(R) constituting the second switch group 98.

Though the delay unit 104 may be one wherein signals are delayed by using analog to digital converters and shift registers or memories, the construction of the delay line 36 described with reference to FIG. 2 may be preferable.

In the case where analog signals are input to a delay unit having a plurality of delay elements between two adjacent input terminals, the analog signals have to be converted into current signals. It is preferable that voltage/current converters for converting into the current signals are provided in the middle of the connections constituting the first connection group 92.

Buffer amplifiers (not shown) are preferably provided in the middle of connections in the second connection group 96 to reduce errors caused by the resistance of a conducting switch in the matrix switch.

Figure 12:
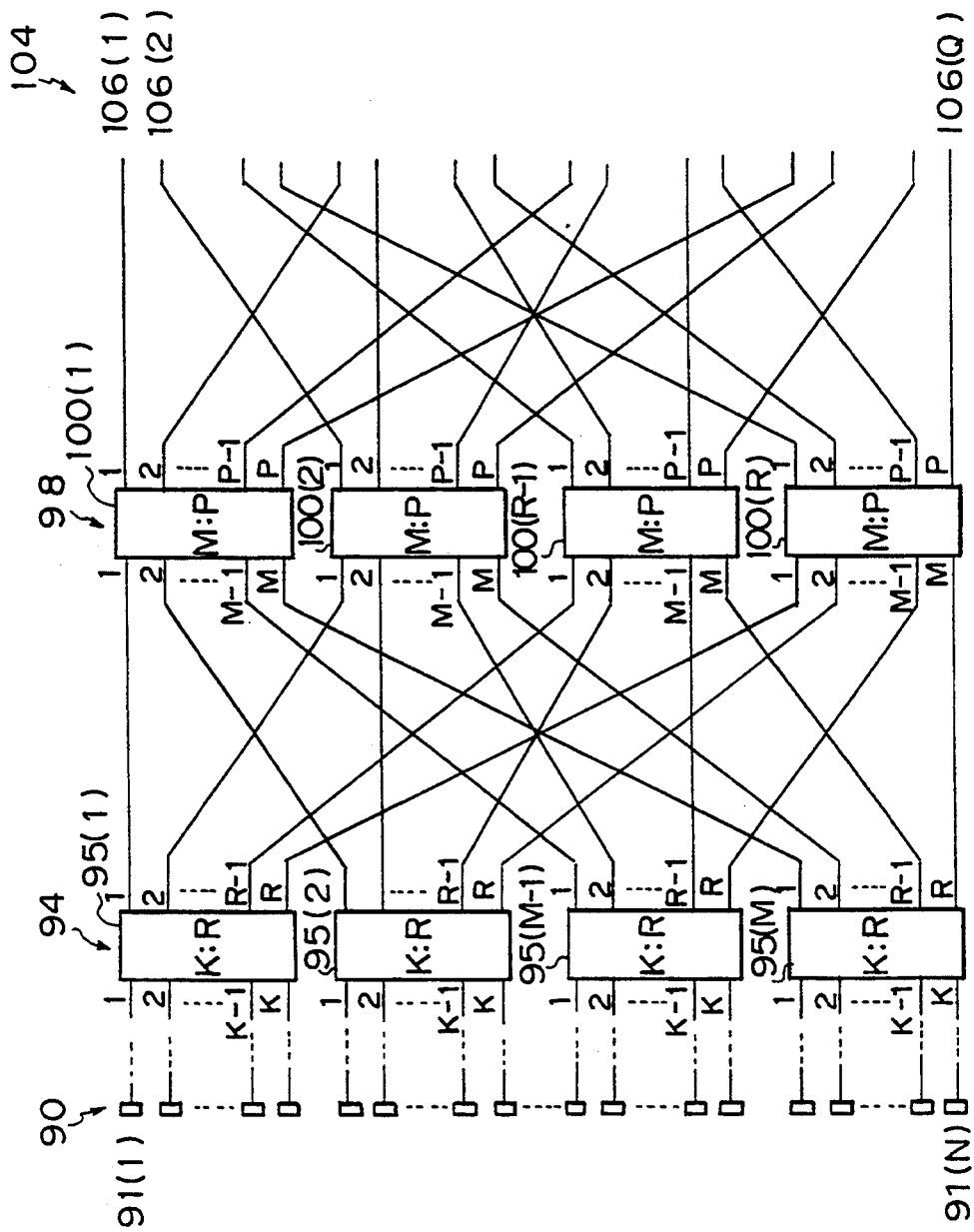
FIG. 12 is a circuit diagram showing an example of a switch circuit used in the acoustic imaging system of FIG. 11.

FIG. 12 shows an example of the switch circuit according to the second embodiment of the present invention.

In this example, an n-th vibrator 91(n) is connected to a k-th input terminal of m-th matrix switch 95(m), where $n=1$ to $N$, $k=(n-1)$ mode $K+1$, and $m=[(n-1)/K]+1$. An r-th output terminal of the m-th matrix switch 95(m) is connected to an m-th input terminal of an r-th matrix switch 100(r), where $r=1$ to R. A q-th input terminal 106(q) of the delay unit is connected to a p-th output terminal of the r-th matrix switch 100(r), where $q=1$ to Q, $p=[(q-1)/R]+1$ and $r=(q-1)$ mode $R+1$.

When an $n_0$-th vibrator 91($n_0$) is desired to be connected to a $q_0$-th input terminal 106($q_0$), a $k_0$-th input terminal is connected to an $r_0$-th output terminal in an $m_0$-th matrix switch 95($m_0$) where $k_0=(n_0-1)$ mode $K+1$, $r_0=(q_0-1)$ mode $R+1$ and $m_0=[(n_0-1)/K]+1$, and an $m_0$-th input terminal is connected to a $p_0$-th output terminal in an $r_0$-th matrix switch 100($r_0$) where $P_0=[(q_0-1)/R]+1$.

Figure 13:
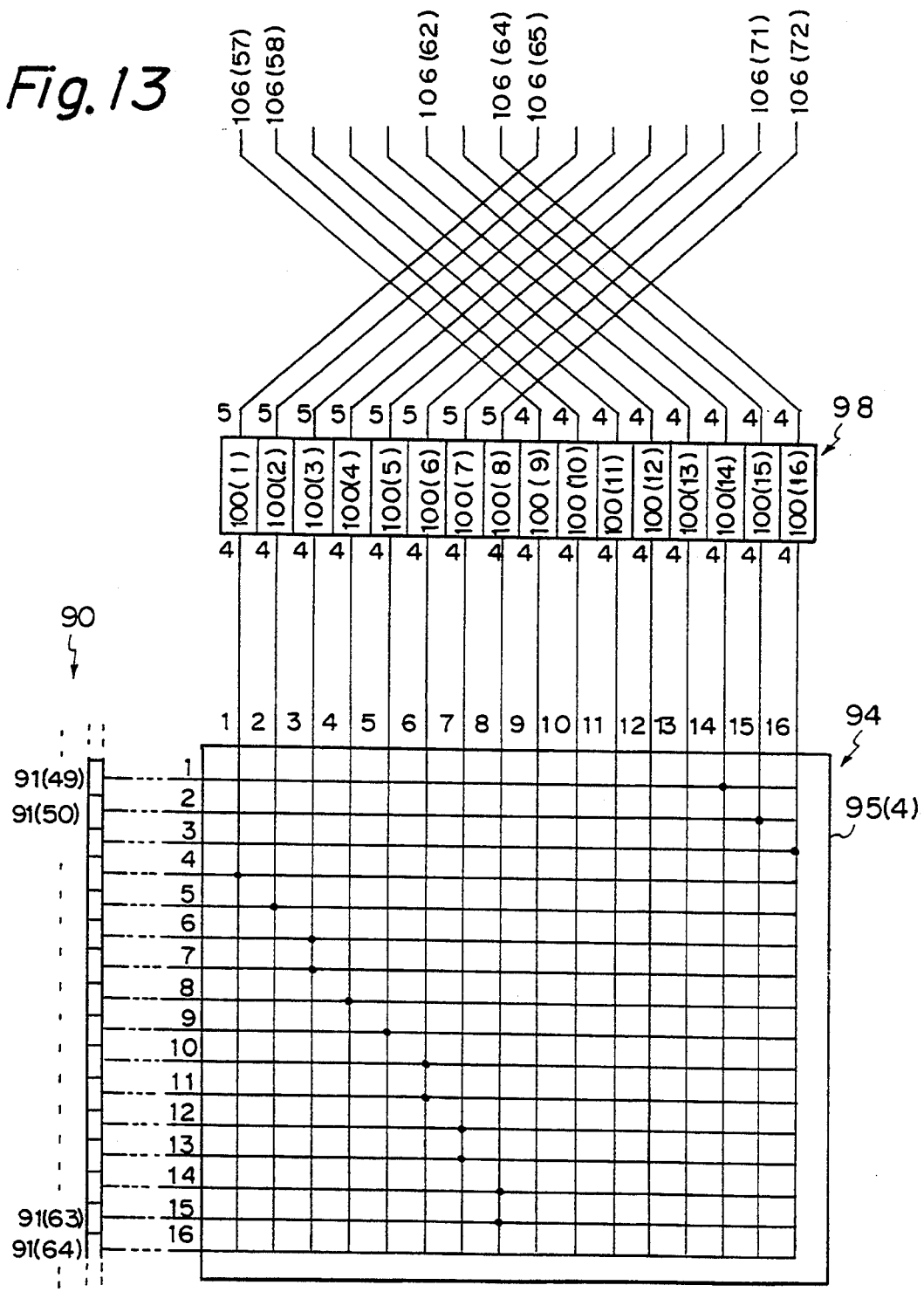
FIG. 13 is a diagram showing an example of setting of switch elements in FIG. 12.

FIG. 13 shows an example of setting switch elements in FIG. 12. The setting of switch elements shown in FIG. 13 corresponds to that of FIG. 5. The black rounds denote conducting switch elements similar to FIG. 5. In FIG. 13, $K=16$, $R=16$, $M=8$, and $P=8$.

Signals generated in vibrators 91(49) to 91(64) are input to terminals 1–16 of the fourth matrix switch 95(4), respectively. The output terminals 1–16 of the matrix switch 95(4) are connected to the fourth input terminals of matrix switches 100(1) to 100(16), respectively. Also, the fifth output terminals of the matrix switches 100(1) to 100(8) are connected to input terminals 106(65) to 106(72) of the delay unit, respectively, and the fourth output terminals of the matrix switches 100(9) to 100(16) are connected to input terminals 106(57) to 106(64), respectively.

As an example, a connection between the vibrator 91(49) and the input terminals 106(62) is explained. In this example, $$k_0 = (n_0 - 1) \bmod K + 1 = (49 - 1) \bmod 16 + 1 = 1$$
$$m_0 = [(n_0 - 1)/K] + 1 = [(49 - 1)/16] + 1 = 4$$
$$p_0 = [(q_0 - 1)/R] + 1 = [(62 - 1)/16] + 1 = 4$$
$$r_0 = (q_0 - 1) \bmod R + 1 = (62 - 1) \bmod 16 + 1$$
$$= 14.$$

Therefore, $k_0$-th input terminal is connected to $r_0$-th output terminal in the matrix switch 95($m_0$), namely, the first input terminal is connected to fourteenth output terminal in matrix switch 95(4), as shown in FIG. 13. Also, $m_0$-th input terminal is connected to $p_0$-th output terminal in the matrix switch 100($r_0$), namely, fourth input terminal is connected to the fourth output terminal in the matrix switch 100(14), as shown in FIG. 13. Upon these connections, the signal generated in the vibrator 91(49) is input to the input terminal 106(62).

It should be noted that a commercially available 8×8 matrix switch IC can be used as the matrix switch 98, and two of the commercially available 8×16 matrix switch IC's are used as the matrix switch 95.

Dynamic focusing over a wide range

FIG. 14 is a block diagram showing a general construction of an acoustic imaging system according to a third embodiment of the present invention. The system shown in FIG. 14 performs the dynamic focusing with fine pitches over a wide range without being affected by attenuation in the object, by combining various time delay and various carrier phases. Two systems of switch circuit groups and a selector group are provided for carrying out the variations, without generation of switching noises, using a single system of the expensive delay line.

In FIG. 14, the apparatus comprises an ultrasonic vibrator 10 arrayed in a predetermined configuration, a transmitting control circuit 110 outputting control signals to select desired transmission drivers in a transmitter/receiver circuit 112 to make the ultrasonic vibrators corresponding to the drivers generate ultrasonic pulses which are transmitter toward an object so that an ultrasonic beam focusing on a desired point in internal portions of the object is formed; and a receiver circuit, receiving signals from the vibrators 10, giving predetermined delay time and phase shift to the respective signals, and summing up the signals.

The receiver circuit is constituted by the transmitter/receiver circuit 112, multiplier group 114, two systems of switch circuit groups 116, 118, selector group 120, and delay unit 122.

The imaging apparatus also comprises display means including a logarithmic amplifier 124 and display unit 126.

The transmitter/receiver circuit 112 has receiver amplifiers amplifying electric signals generated in the respective vibrators. The multiplier group 114 includes two or four variable gain amplifiers with respect to each input signal to derive two or four signals from each input signal. In the case where two sorts of signals are derived, the signals are input parallel to the switch circuit groups 116 and 118. In the case where four sorts of signals are derived, two sorts of signals are input to one switch circuit group 116 or 118 and another two sorts of signals are input to another switch circuit group 118 or 116. The switch circuit groups 116 and 118 include a multitude of switch elements constructed so as to select connections between the vibrators 10 and input taps of the delay unit 122, to determine delay time of the signal generated in each vibrator. The selector group 120 selects one of the switch circuit groups 116 or 118, without generating switching noises. The delay unit 122 gives input signals delay time according to positions of the input taps. While the selector group 120 selects one of switch circuit groups 116 or 118, desired switching is carried out in the other switch circuit group 116 or 118.

Figure 15A:
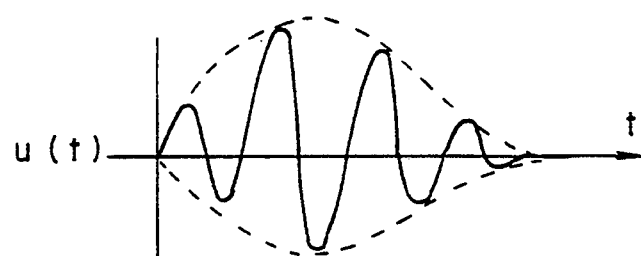
FIGS. 15A to 15C are waveform diagrams explaining the effect of phase control and delay time control.

Before explaining the detailed construction of the constituents shown in FIG. 14, effect of the phase control and the delay time control are explained. A signal received in an ultrasonic vibrator 10 is represented more practically than formula (1) as follows:

$$u(t) = a(t) \sin(\omega t + \phi) \tag{17},$$

where the a(t) is an envelope component, $\omega$ is an angular frequency of a carrier signal, and $\phi$ is a phase angle of the carrier signal. FIG. 15A illustratively shows the signal of the formula (17). A signal delayed from the signal of the formula (17) by $t_0$ is represented as $$u(t-t_0) = a(t-t_0) \sin\{\omega(t-t_0) + \omega\} \tag{18}$$

Figure 15B:
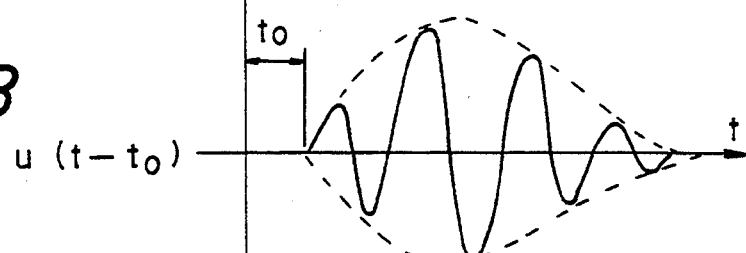

FIG. 15B represents the signal of the formula (18). The delay time control described above is realized by changing the input taps of the delay unit 122. In this case, the envelope component a(t) as well as the carrier signal is delayed by $t_0$.

A signal wherein only the carrier signal is delayed by $t_0$ is represented as $$u'(t-t_0) = a(t) \sin\{\omega(t-t_0) + \omega\} \tag{19}$$

Figure 15C:
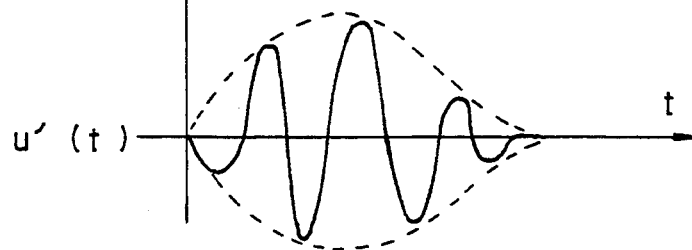

FIG. 15C shows the signal of the formula (19). The signal of FIG. 15C has the same envelope component as that of FIG. 15A but is in the same phase of carrier as that of FIG. 15B. The phase control described above is realized by changing the amplification factors in multiplier group 114. This phase control is in principle similar to those described referring to FIG. 7.

In phase adjustment represented by formula (18) and FIG. 15B, complete coincidence of the signals are obtained because a whole waveform can be shifted by $t_0$. Therefore, effective focusing is obtained. On the other hand, in phase adjustment represented by formula (19) and FIG. 15C, complete coincidence is not obtained because the envelope components do not shift, but approximate coincidence is obtained. Also, the phase adjustment according to the formula (18) requires a more expensive system than that of the formula (19).

Therefore, in this embodiment of the present invention, rough phase adjustment is stepwise attained by the delay unit 122 realizing phase shift according to the formula (18) and fine phase adjustment within a step is attained by the multiplier group 114 realizing phase shift according to formula (19).

For example, when an amount of delay is smaller than ±0.5λ, where λ is the wavelength of the ultrasonic signal, only the phase control by the multiplier group 114 is used to focus the received signal, and when the amount is larger than ±0.5λ, delay time in delay unit 122 is changed by switching in switch circuit group 116 or 118 so that the required amount of phase shift in the multiplier group 114 becomes smaller than ±0.5λ.

Thus, the effect of the attenuation in a living body is reduced by suppressing the amount of phase shift of the carrier to a certain level.

The signals generated in the vibrator are amplified by the amplifiers in the transmitter/receiver circuits 112 so that apodizing of the received signals is performed, for example, in a Gaussian curve having a center at a position of the scan line. The apodizing may also be performed in the multiplier group 114. In addition, the apodizing is set to zero for unnecessary signals. In dynamic focusing, the width of the aperture is gradually varied according to the depth of focus. These functions are attained by gradually varying the amount of the apodizing in vibrators positioned apart from the center.

Figure 16:
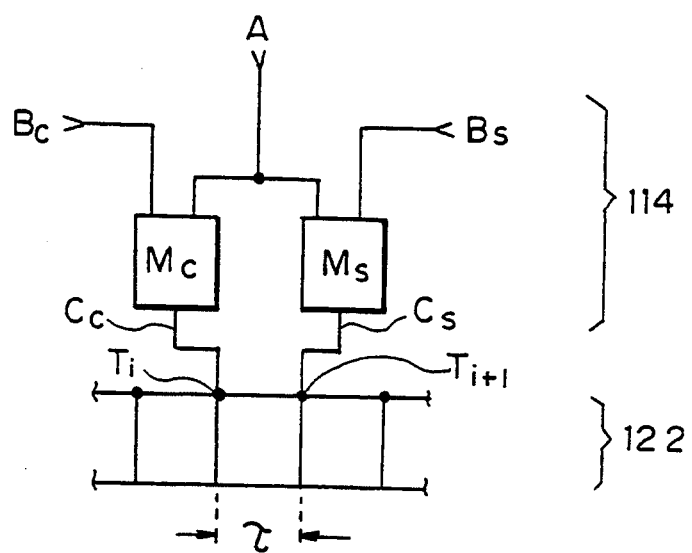
FIG. 16 is a diagram explaining phase control according to the present invention.

FIG. 16 is a diagram for explaining operations of the multiplier group 114. In FIG. 16, two multipliers $M_c$ and $M_s$ in the multiplier group 114 and a part of the delay unit 122 are schematically shown. The switch circuit group 116 and 118 and the selector group 120 are left out to simplify the explanation. The two multipliers $M_c$ and $M_s$ correspond to two multipliers for a vibrator when two sorts of signals are derived from a signal, or to two of four multipliers for a vibrator when four sorts of signals are derived from a signal.

In the following descriptions, an output signal of the transmitter/receiver circuit 112 is represented by A, and coefficients in the multipliers $M_c$ and $M_s$ are represented by $B_c$ and $B_s$, respectively. As shown in FIG. 16, two sorts of signals $C_c = A \times B_c$ and $C_s = A \times B_s$ having different gain and polarity are derived from the input signal A, and are input through the switch circuit group 116 or 118 and the selector group 120 (shown in FIG. 14 and not shown in FIG. 16) to two adjacent taps $T_i$ and $T_{i+1}$ of the delay unit 122, respectively. The time difference between the adjacent taps is represented by $\tau$.

As discussed before, according to the formulae (6) and (7), phase shift $\phi$ in a carrier having angular frequency $\omega$ is obtained when $B_c = \cos(\phi) - \sin(\phi)\cos(\omega\tau)/\sin(\omega\tau)$
$B_s = \sin(\phi)/\sin(\omega\tau)$.

A central frequency of a frequency distribution of the ultrasonic wave is used as the frequency $\omega$. Though the central frequency varies because of attenuation in a living body, a value within the variation range may be used as $\omega$. When a 3.5 MHz probe is used, a value corresponding to 3.5 MHz or less than 3.5 MHz considering the attenuation may be used as $\omega$ in order to calculate the values of $B_c$ and $B_s$. When the multiplier group 114 commits the apodizing, the $B_c$ and $B_s$ become $B_c = apj \cdot \{\cos(\phi) - \sin(\phi)\cos(\omega\tau)/\sin(\omega\tau)\}$
$B_s = apj \cdot \sin(\phi)/\sin(\omega\tau)$, where apj is a value of apodizing.

Any value of $\tau$ wherein $\omega\tau \leq \pi/2$ brings out good results, only if interpolation between $T_i$ and $T_{i+1}$ is carried out, but a value of $\tau$ wherein $\omega\tau = \pi/2$ is more preferable if extrapolation is also carried out, for example, if the phase control is attained in a range of $-\pi$ to $+\pi$.

Only if the interpolation between $T_i$ and $T_{i+1}$ is carried out and if a small value of $\tau$ is used, then the influence of a drop in the carrier frequency due to attenuation in a living body is reduced, but a larger number of the input taps of the delay line is required and the size of the switch circuit groups 116 and 118 and the selector group 120 is enlarged.

Therefore, in the following descriptions, an example where the phase control is carried out in a range of $-\pi$ to $+\pi$ using a $\tau$ value wherein $\omega\tau = \pi/2$, is described.

When $\omega\tau$ is equal to $\pi/2$, $B_c$ and $B_s$ become $\cos(\phi)$ and $\sin(\phi)$, respectively.

Figure 18:
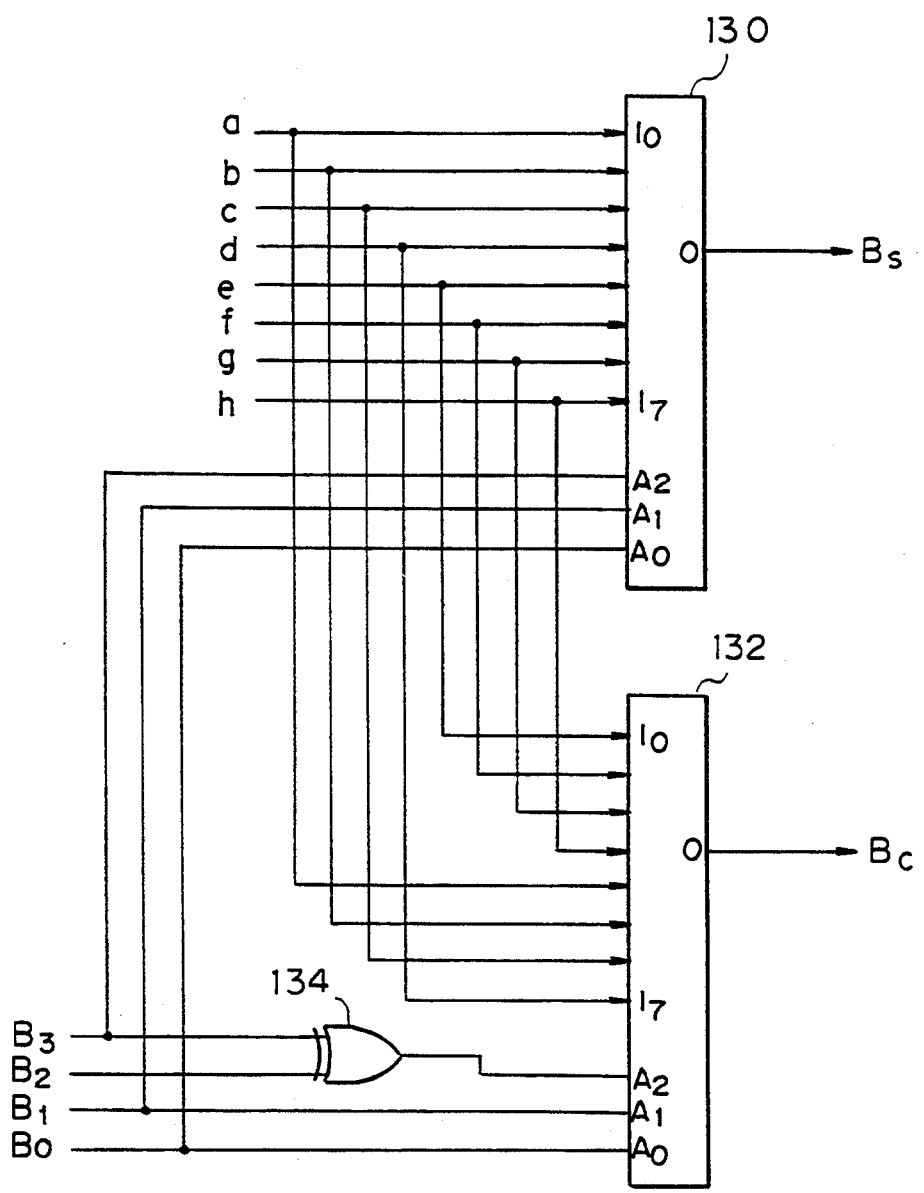
FIG. 18 is a circuit diagram of an example circuit for generating the signals $B_s$ and $B_c$.

FIG. 17A shows the phase control value $\phi$ in the range of $-\pi$ to $+\pi$, and FIGS. 17B and 17C show the corresponding values of $B_s$ and $B_c$, respectively. If the phase control is performed in sixteen notches within that range, eight voltage values a, b, c . . . h shown in FIGS. 17B and 17C are sufficient for $B_c$ and $B_s$ because they are symmetrical functions. These eight voltage values can be commonly used for all of the signals. If four bit data $B_0$ to $B_3$ are assigned to sixteen notches as shown in FIG. 17D, a circuit for generating the $B_c$ and $B_s$ is realized by two analog multiplexers 130 and 132 and an exclusive OR gate 134, as shown in FIG. 18, and, possibly two D/A converters instead of the two analog multiplexers 130 and 132, and in this case, apodizing is also attained in this circuit.

Figure 19:
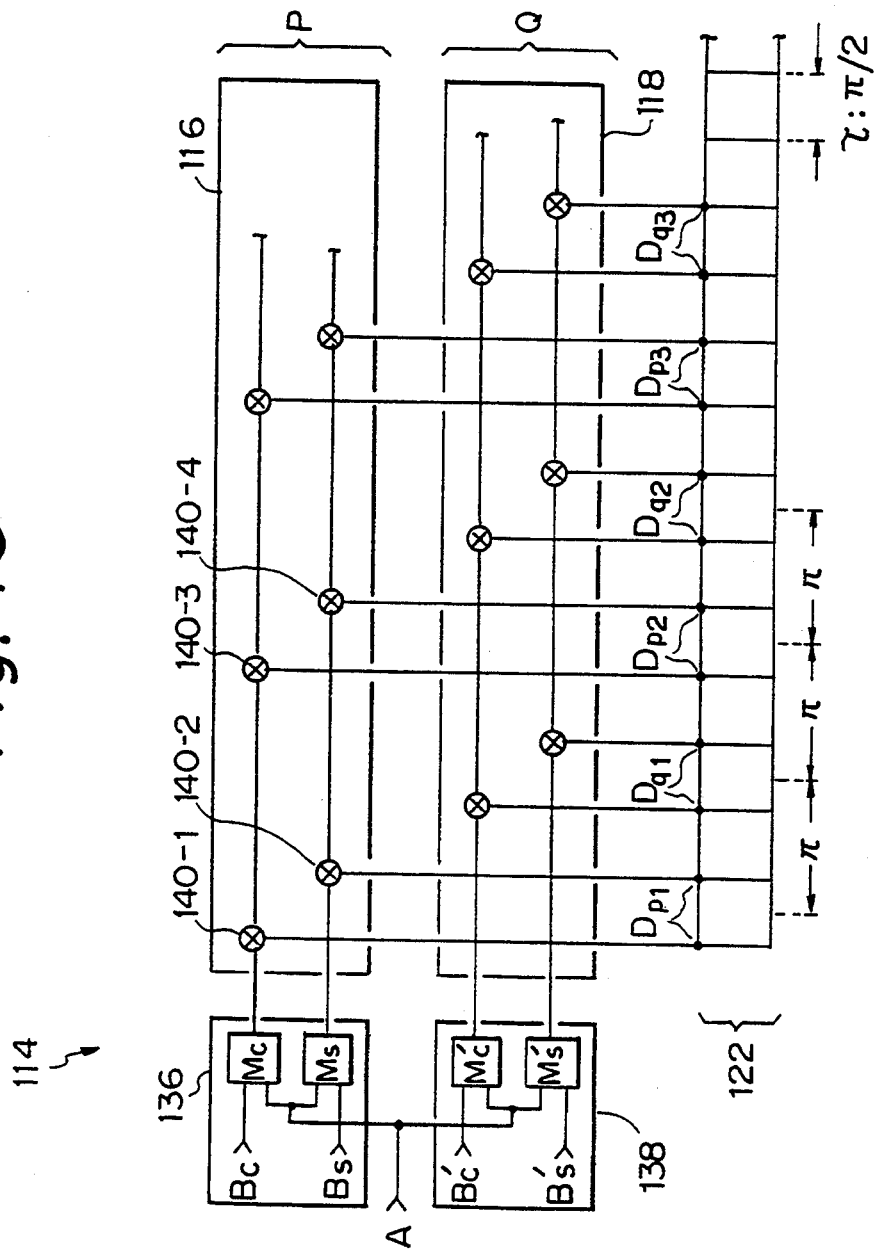
FIG. 19 is a diagram explaining a first example of a more detailed construction of the acoustic imaging system of FIG. 14.

FIG. 19 is a diagram explaining operations of the multiplier group 114, the switch circuit groups 116 and 118, and the selector group 120, in the case where four signals are derived from each signal, and thereby two system construction starts from the multiplier group 114. The operations of multiplier circuits 136 and 138 have been explained with reference to FIG. 16 to FIG. 18. The selector group 120 is not clearly illustrated in FIG. 19 to simplify the drawing. The signal from the transmitter/receiver circuit 112 (FIG. 14) is represented by A. In practice, the n multiplier circuits 136 and 138 are necessary where n is the number of vibrators. Though not shown in FIG. 19, the switch circuit group 116 and 118 have switch elements for other vibrators other than the switch elements 140-1, 140-2, . . . etc.

While the multiplier circuit 136 and the switch circuit group 116 constituting a system P are connected through the selector group 120 (FIG. 14) to the delay unit 122, the multiplier circuit 138 and the switch circuit group 118 constituting a system Q are disconnected and are given signals for the next focus point. Two signals having different gain or different gain and polarity are output from the multiplier circuit 136 to the switch circuit group 116. In the switch circuit group 116, one of the pairs of switch elements, for example, 140-3 and 140-4 connected to two adjacent input taps $D_{p2}$ of the delay unit 122 are selected. Therefore, two signals output from the multiplier circuit 136 are superimposed with time difference $\tau$. Phase adjustment at intervals of $2\pi$ is attained by changing the selection of the switch pair, and phase adjustment within that interval is attained by changing the values of $B_c$ and $B_s$. The switch circuit groups 116 and 118 are alternatively selected by the selector group 120 (FIG. 14) to be connected to the delay unit 122, and the next control signals are set during disconnection.

Pairs of input taps $D_{p1}$, $D_{p2}$, $D_{p3}$ . . . for the system P and pairs of input taps $D_{q1}$, $D_{q2}$, $D_{q3}$ . . . for the system Q are arranged at intervals of $2\pi(4 \times \tau)$. Though the input tap pairs $D_{q1}$, $D_{q2}$, $D_{q3}$ . . . are shifted from the input tap pairs $D_{p1}$, $D_{p2}$, $D_{p3}$ . . . by $\pi$ as in the example shown in FIG. 19, the input tap pairs $D_{p1}$, $D_{p2}$, $D_{p3}$ . . . may be commonly used by the systems P and Q. However, in this arrangement, delay time change of $2\pi$ occurs in switching from one system to another while the focus point is gradually moved. By employing the staggered arrangement shown in FIG. 19, change of delay time is limited to $\pi$.

Figure 20:
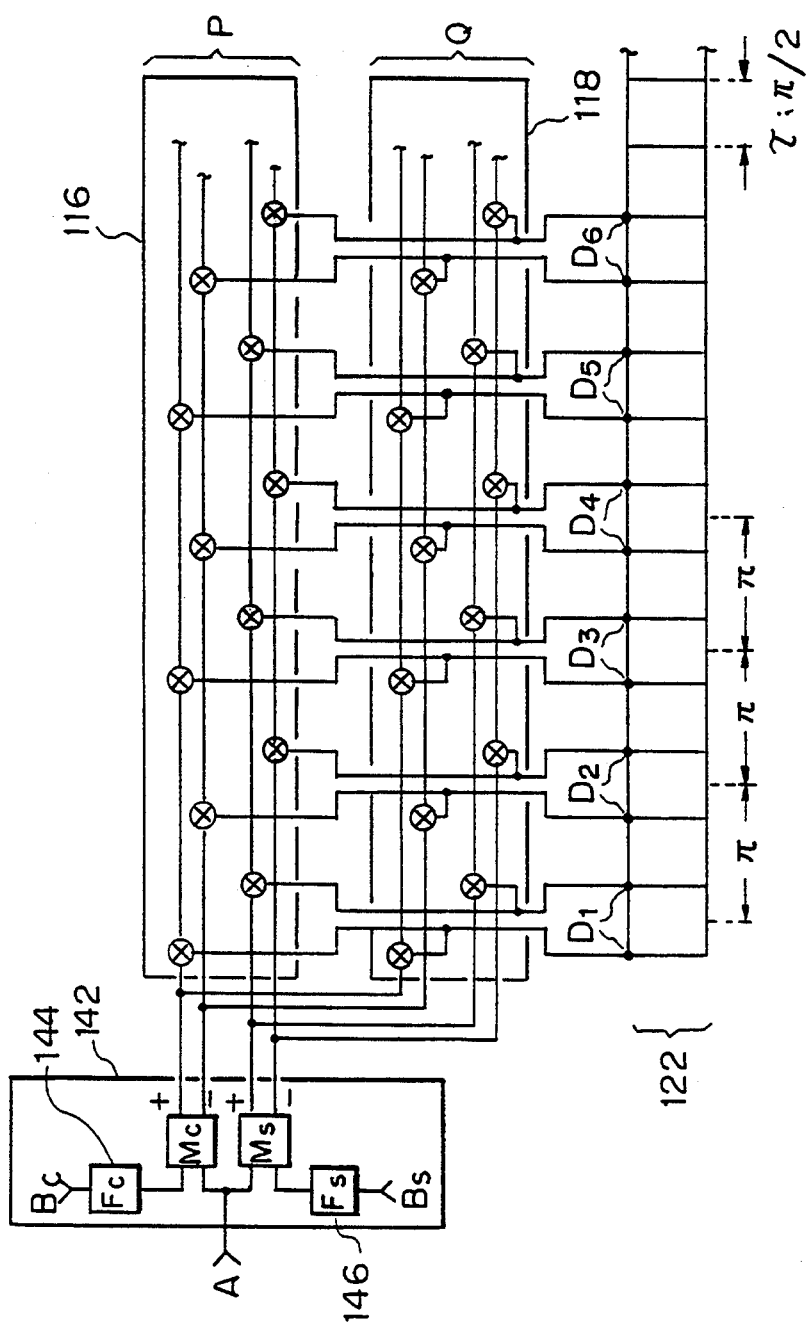
FIG. 20 is a diagram explaining a second example of a more detailed construction of the acoustic imaging system of FIG. 14.

FIG. 20 is a diagram showing another example where two systems are provided only for the switch circuit group 116 and 118, and a single multiplier circuit 142 is provided for each signal. An operation of the multiplier circuit 142 is the same as that described with reference to FIG. 16 to FIG. 18. The selector group 120 is also not clearly illustrated in FIG. 20.

Since the multiplier circuit 142 is commonly used by systems P and Q, noises are generated when the values $B_c$ and $B_s$ are changed. Then, low pass filters 144 and 146 are provided for suppressing the generation of noise. Since high frequency components are not included in paths from the circuits for making the $B_c$ and $B_s$ to the multipliers $M_c$ and $M_s$, filters having a low cut-off frequency comparable with a switching frequency (several micro-seconds) can be used for the low pass filters 144 and 146.

The multipliers $M_c$ and $M_s$ provided in the multiplier circuit 142 output signals having different gain and/or polarity in the form of differential output pairs.

Input tap pairs $D_1$, $D_2$, $D_3$ . . . , are arranged at intervals of $\pi$ in the delay unit 122. The non-inverted outputs of the differential outputs pairs are supplied to the odd-numbered input tap pairs $D_1$, $D_3$, $D_5$ . . . , and the inverted outputs of the differential output pairs are supplied to the even-numbered input taps pairs $D_2$, $D_4$, $D_6$ . . . .

Employing this arrangement, while the focus point is gradually moved in dynamic focusing, change of delay time is limited to $\pi$, and variation in values of $B_c$ and $B_s$ is minimized even when the delay time is changed by $\pi$, since inverted signals corresponding to a $\pi$ phase shift are supplied at this time. If a large variation of $B_c$ and $B_s$ is allowed, single outputs can be employed instead of differential outputs, and the number of wires connecting the multiplier group 114 and the switch circuit groups 116 and 118 become one half.

Figure 21:
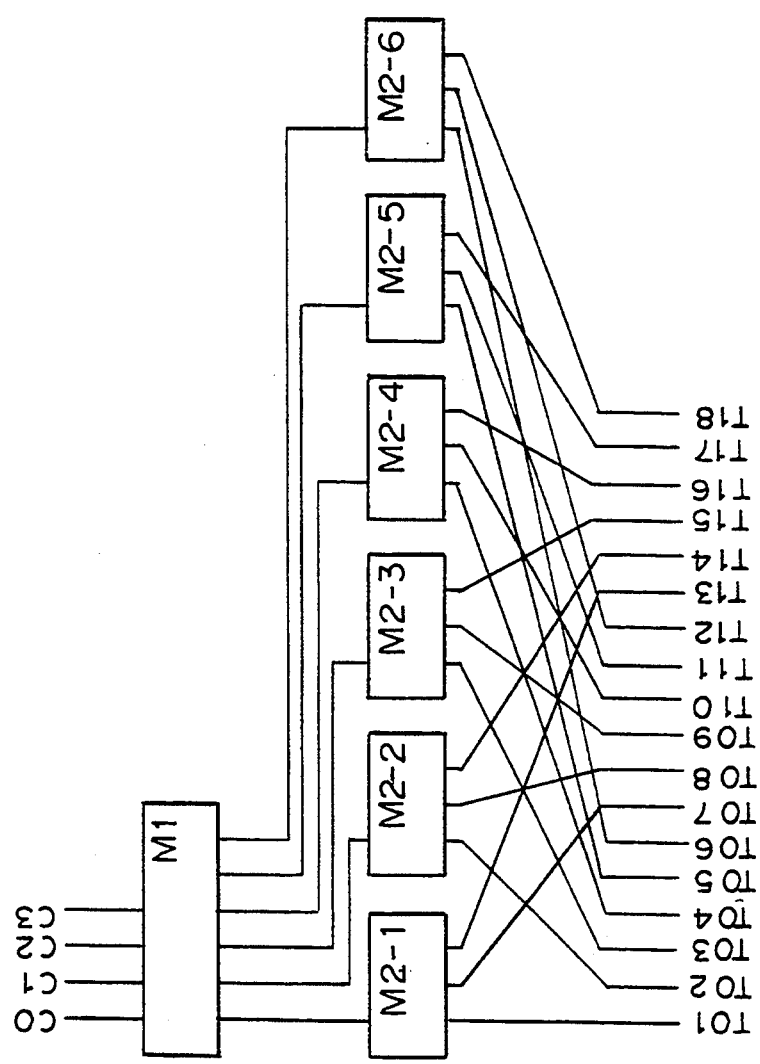
FIG. 21 is a circuit diagram showing a first example of a more detailed construction of a switch circuit group 116 or 118 of FIG. 14.

The construction of the switch elements 140-1, 140-2, . . . shown in FIG. 19 and FIG. 20 are not practical but ideal. FIG. 21 shows an example of a practical construction of the switch circuit group 116 or 118 (FIG. 14).

C0 to C3 denote four signals generated in four adjacent vibrators. AS described with reference to FIG. 11, the number of output terminals (called R in FIG. 11) of a matrix switch M1 (FIG. 21) in a first stage must be determined by considering resolution of delay time and maximum time difference required in the four adjacent vibrators. In this example, the value R has been determined as six. Then, the number of analog demultiplexers M2 in the second stage becomes six (M2-1 to M2-6 in FIG. 21). If a required number of taps is eighteen (T01 to T18 in FIG. 21), the number of output terminals of the analog demultiplexers M2-1 to M2-6 becomes 18/6=3. Connecting the matrix switches M1 and the analog demultiplexers M2-1 to M2-6 as shown in FIG. 21, a function of a 4:18 matrix switch is realized by those elements as described with reference to FIG. 11.

As a whole, the required number of the circuits of FIG. 21 is n/4 (for $M_c$)+n/4 (for $M_s$) for the system P and n/4 (for $M'_c$)+n/4 (for $M'_s$) for the system Q in the construction shown in FIG. 19, and is n/2 (for $M_c$)+n/2 (for $M_s$) for the system P and n/2 (for $M_c$)+n/2 (for $M_s$) for the system Q in the construction shown in FIG. 20, where n is the number of vibrators.

Intervals between taps T01 to T18 are 4×$\tau$ in the examples of FIG. 19 and FIG. 20, and the total number of taps is 2×18 for system P and 2×18 for system Q in the example of FIG. 19, and is 4×18 for system P and 4×18 for system Q in the example of FIG. 20. These numbers (m=36 in FIG. 19 or m=72 in FIG. 20) of signal lines go out from the switch circuit 116 and 118 of FIG. 14.

Figure 22:
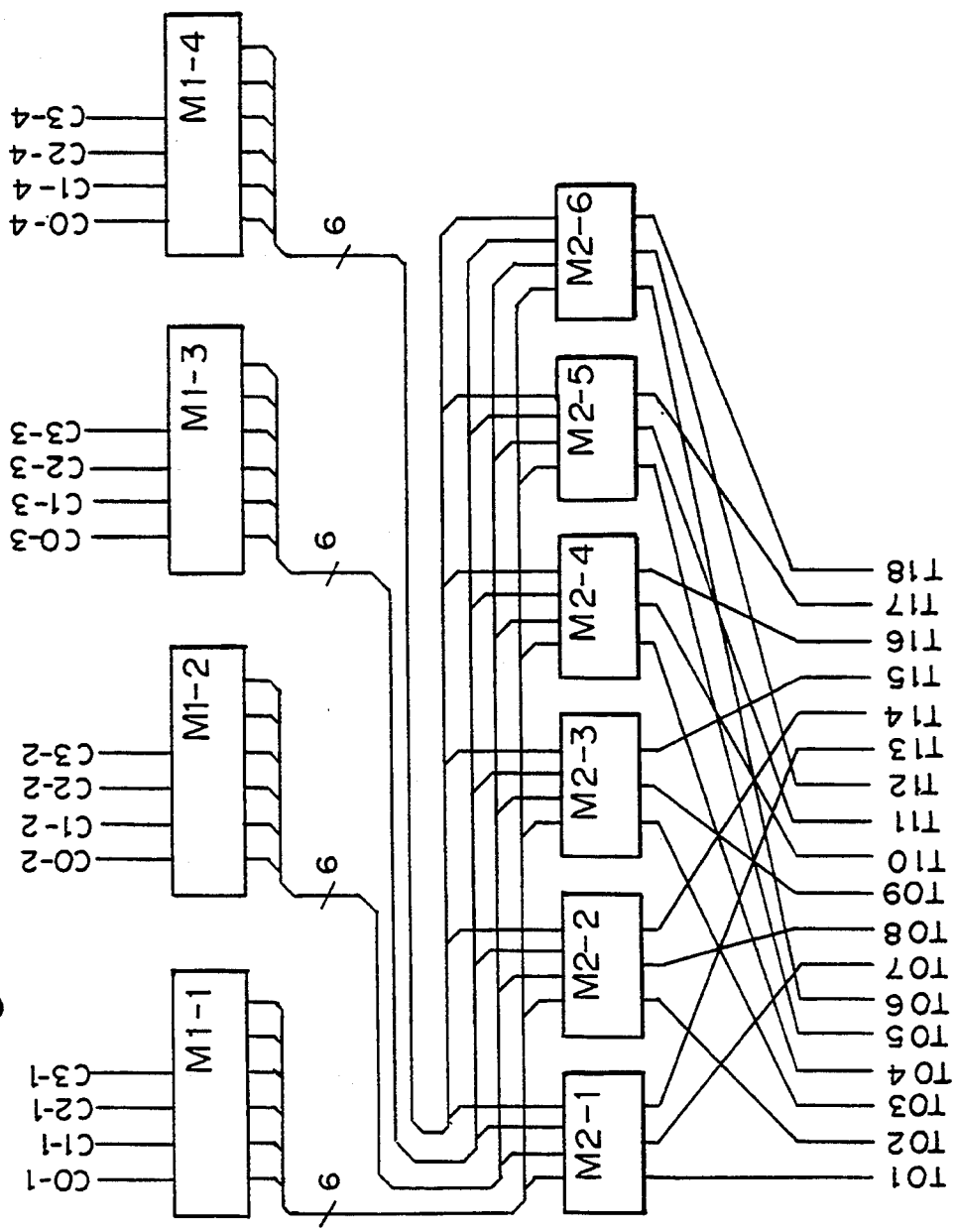
FIG. 22 is a circuit diagram showing a second example of a more detailed construction of the switch circuit group 116 or 118 of FIG. 14.

Referring to FIG. 22, by using 4×3 matrix switches instead of the analog demultiplexers, the 4×3 matrix switches M2-1 to M2-6 accept signals from four matrix switches Mi-1 to M1-4.

In the construction of FIG. 19, if only the input taps $D_{p1}$, $D_{p2}$, . . . are used without using the input taps $D_{q1}$, $D_{q2}$ . . . as described before, the number of input taps become one half. Even in this case, the scales of the switch circuit groups 116 and 118 and the selector group 120 are the same.

Figure 23:
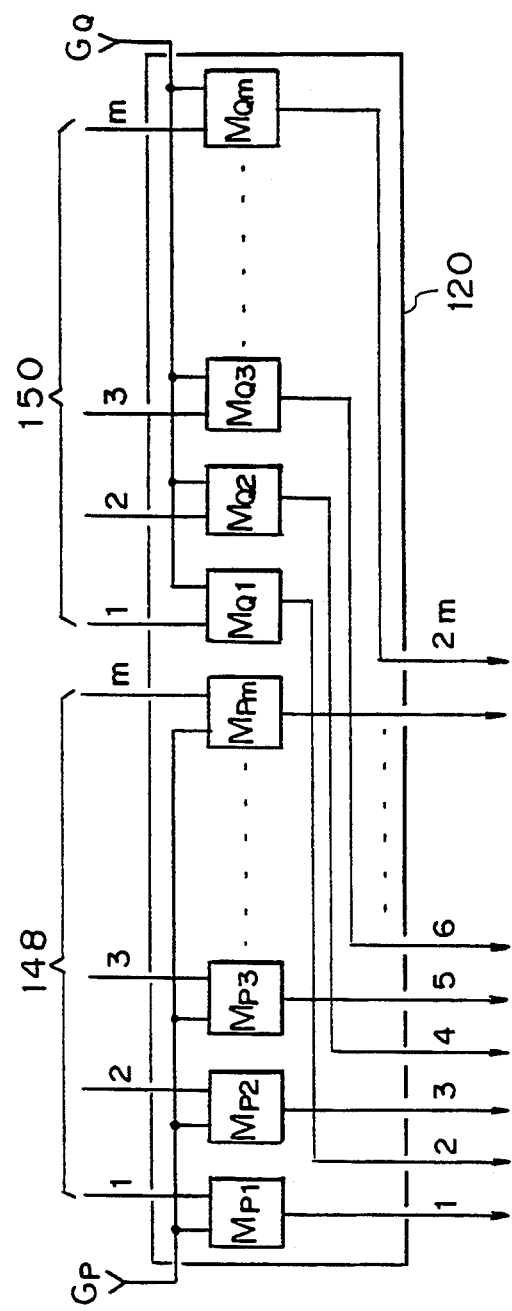
FIG. 23 is a circuit diagram showing a more detailed construction of a selector group 120 of FIG. 14 in the case shown in FIG. 19.

FIG. 23 shows a more detailed construction of the selector group 120 to be used with the switch circuit group having the construction shown in FIG. 19.

$M_{P1}$ to $M_{Pm}$ and $M_{Q1}$ to $M_{Qm}$ denote analog multipliers or variable gain amplifiers, provided for selecting m signals from one of two systems P and Q. For example, m signals 148 from the switch circuit group 116 are input to the $M_{P1}$ to $M_{Pm}$, and m signals 150 from the switch circuit group 118 are input to the $M_{Q1}$ to $M_{Qm}$.

The signals 148 are controlled by another common input signal $G_p$ so as to pass through or be obstructed according to the signal $G_p$, and the signals 150 are controlled by another common input signal $G_Q$.

Figures 24A, 24B:
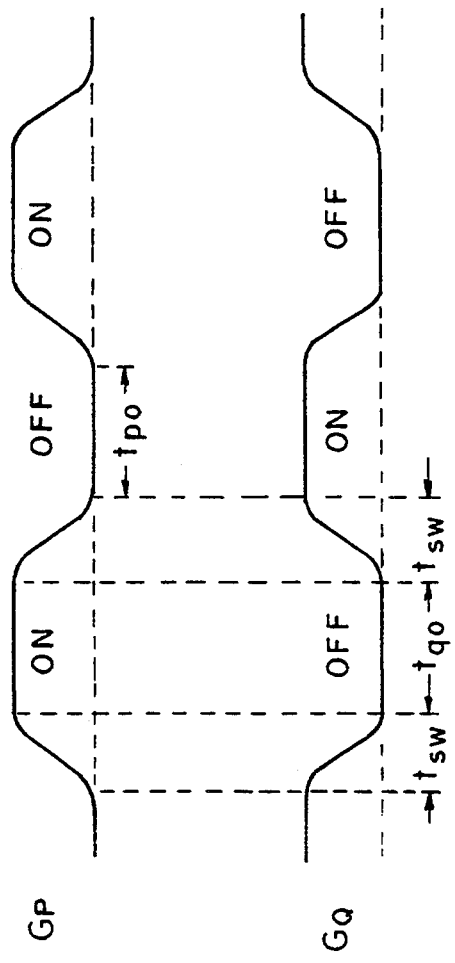
FIGS. 24A and 24B are timing charts explaining an operation of the selector group 120 of FIG. 23.

FIGS. 24A and 24B are timing charts for the control signals $G_P$ and $G_Q$. As shown in FIGS. 24A and 24B, switching from one to another is smoothly performed during intervals $t_{SW}$, and signals from system Q are completely obstructed during intervals $t_{q0}$. During this intervals $t_{q0}$, control values in system Q are changed, and during intervals $t_{p0}$, control values in system P are changed.

In the case of FIG. 23, m is d/2, where d is number of taps of the delay unit. Amplification factors of the multipliers are proportional to $G_P$ and $G_Q$, and the $G_P$ and $G_Q$ are controlled so that $G_P+G_Q$=constant. In these conditions, selection of one of two systems in the selector group 120 is smoothly performed with small amplitude variation of output signals during the intervals $t_{SW}$.

Figure 25:
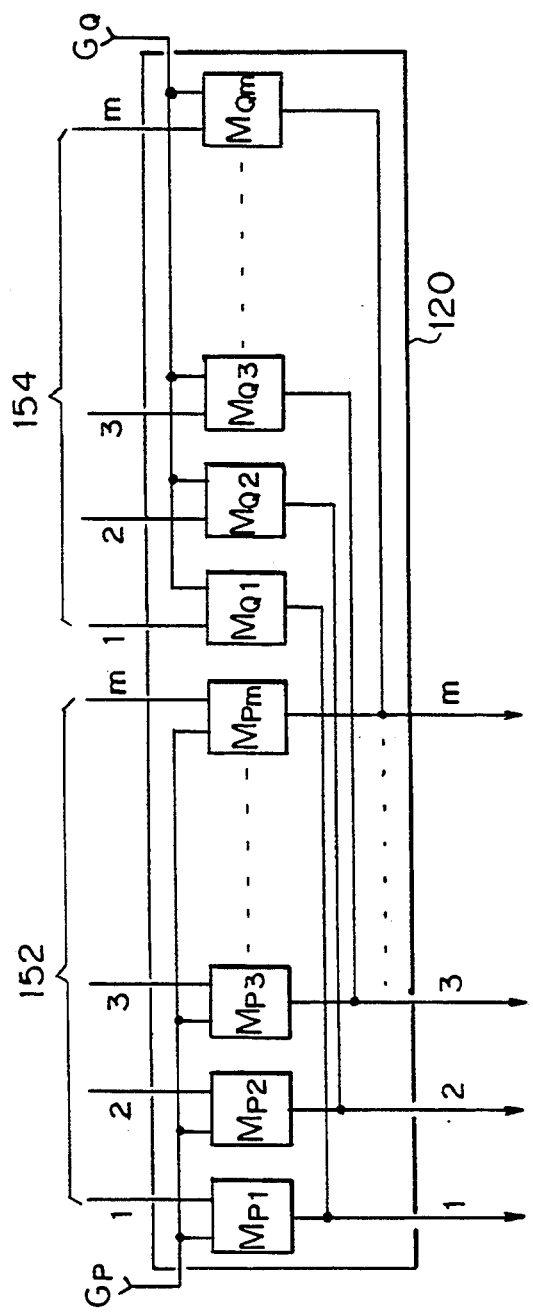
FIG. 25 is a circuit diagram showing a more detailed construction of the selector group 120 of FIG. 14 in the case shown in FIG. 20.

FIG. 25 shows a detailed construction of the selector group 120 to be used with the switch circuit group having the construction shown in FIG. 20.

Analog multipliers or variable gain amplifiers $M_{P1}$ to $M_{Pm}$ and $M_{Q1}$ to $M_{Qm}$ are provided for selecting m signals from m×2 signals from the switch circuit groups 116 and 118. For example, m signals 152 from the switch circuit group 116 are input to the $M_{P1}$ to $M_{Pm}$ and m signals 154 from switch circuit group 118 are input to the $M_{Q1}$ to $M_{Qm}$. The signals 152 are controlled by another common input signal $G_P$, and the signals 154 are controlled by another common input signal $G_Q$.

Figures 26A, 26B:
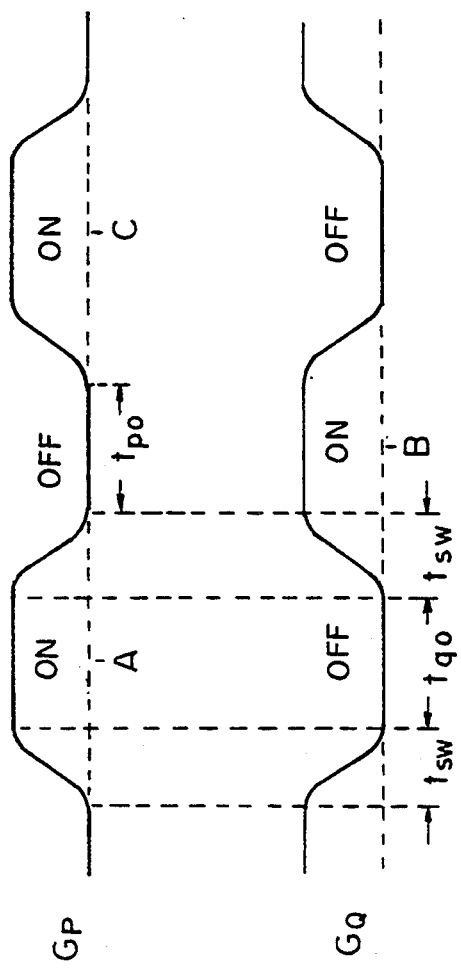
FIGS. 26A and 26B are timing charts explaining an operation of the selector group 120 of FIG. 25.

FIGS. 26A and 26B are timing charts for the control signals $G_P$ and $G_Q$. Similar to FIGS. 24A and 24B, switching from one to another is smoothly performed during intervals $t_{SW}$. In this example, movement of the focus only by the phase control may be attained by using the multipliers in some cases at any of the timings denoted by A, B and C.

In the case of FIG. 25, the respective output of the $M_{P1}$ to $M_{Pm}$ are added to the respective output of the $M_{Q1}$ to $M_{Qm}$ (e.g., by current addition in constant current circuits), and the number of output signals m is equal to d where d is the number of taps of delay unit 122.

Figure 27:
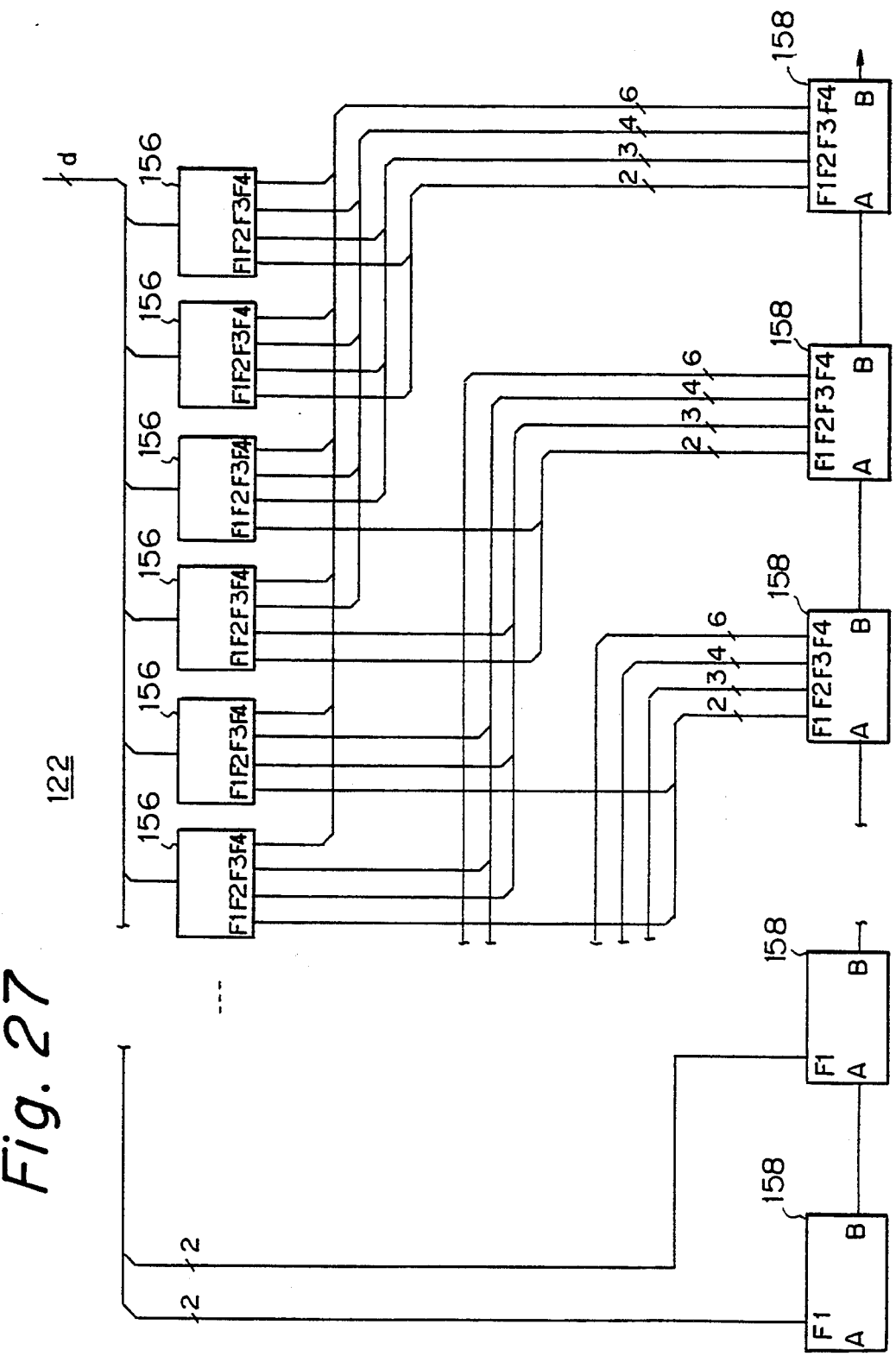
FIG. 27 is a circuit diagram showing a more detailed construction of a delay unit 122 of FIG. 14.

FIG. 27 shows an example of a practical construction of the delay unit 122. The delay unit 122 includes a plurality of analog demultiplexers 156 and partial delay circuits 158. Each analog demultiplexer 156 has an input terminal, connected to each of the output terminals of the selector group 120, and a plurality of output terminals. For example, the analog demultiplexer 156 has four output terminals F1 to F4, which are selected according to a probe frequency, e.g. 2.5 MHz, 3.5 MHz, 5.0 MHz, and 7.5 MHz, respectively, as shown in FIG. 27. The partial delay circuits 158 are serially connected to each other and each has a required number of input terminals for each probe frequency, e.g., six input terminals for F4, four input terminals for F3, three input terminals for F2, and two input terminals for F1, as shown in FIG. 27.

The input terminals of the partial delay circuits 158 on the right side in the figure correspond to the smaller delay time. As shown in FIG. 27, the input terminals corresponding to the larger delay time are not used in higher probe frequencies if the value of d is constant in all of the probe frequencies. In other words, if the value d is constant in all of the probe frequencies, the larger delay time is required in the lower probe frequencies, and this increases the cost of the system. Therefore, it is preferable that, for example, the maximum delay time and the value d are determined for a probe frequency of 3.5 MHz and the same maximum delay time and smaller d value are used for a probe frequency of 2.5 MHz.

Figure 28:
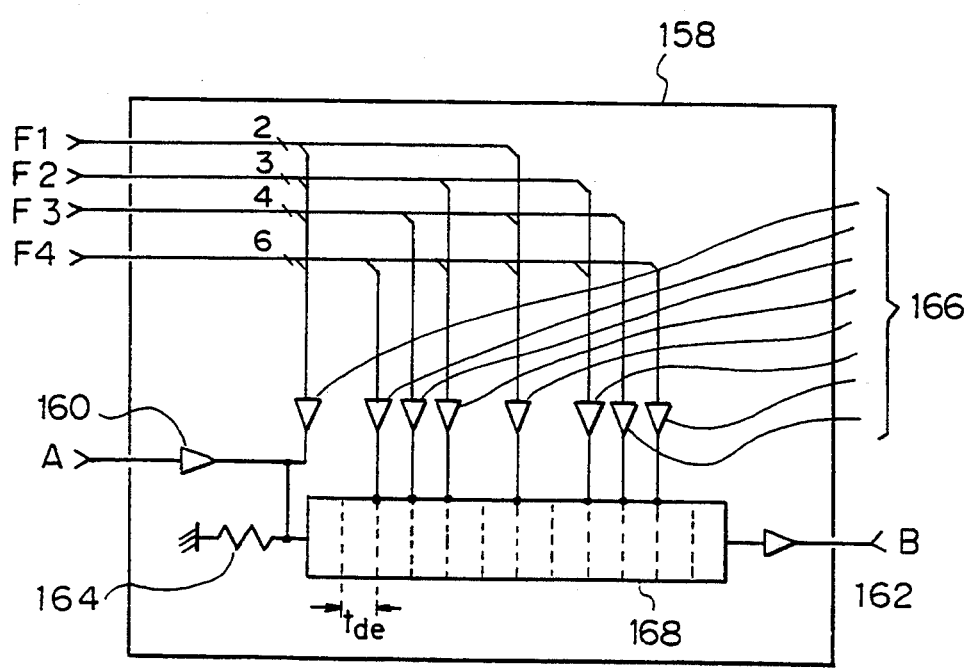
FIG. 28 is a circuit diagram showing a more detailed construction of a delay circuit 158 of FIG. 27.

FIG. 28 shows a detailed construction of the partial delay circuit 158 shown in FIG. 27. Constant current amplifiers 160 and 162 are provided for serially connecting the partial delay circuits 158. Constant current amplifiers 166 have resistors (not shown) in input sides for current addition. Amplification factors of the amplifiers 160 and 162 are variable for disconnecting unused partial delay circuits 158. The amplifier 162 has a resistor (not shown) in an input side for terminating delay lines 168. A resistor 164 is provided for terminating in an input side of the partial delay circuit 158. Each delay line 168 has a value of delay time e.g., $t_{de}=18$ nsec. The partial delay circuit 158 includes twelve serially connected delay lines 168.

For 7.5 MHz, i.e., F4, six taps are arranged at intervals of $2 \times t_{de}=36$ nsec, which corresponds to phase delay of $\pi/4$ in about 6.94 MHz. For 5.0 MHz, i.e., F3, four taps are arranged at intervals of $3 \times t_{de}=54$ nsec, which corresponds to phase delay of $\pi/4$ in about 4.63 MHz. For 3.5 MHz, i.e., F2, three taps are arranged at intervals of $4 \times t_{de}=72$ nsec, which corresponds to phase delay of $\pi/4$ in 3.47 MHz. For 2.5 MHz, i.e., F1, two taps are arranged at intervals of $6 \times t_{de}=108$ nsec, which corresponds to phase delay of $\pi/4$ in about 2.31 MHz.

The delay line 168 may be divided into two elements between which a constant current amplifier is provided. In this construction, frequency characteristics and reflection in the partial delay circuit are improved.

We claim:

1. An acoustic imaging system for producing images of internal portions of an object comprising:
   a plurality of transducers for respectively generating acoustic waves so as to form an acoustic beam penetrating the object and for respectively converting reflected waves into corresponding electric signals;
   a plurality of first multiplication means for multiplying values of the electric signals output from the respective transducers by first real numbers, respectively;
   a plurality of second multiplication means for multiplying values of the electric signals output from the respective transducers by second real numbers, respectively;
   a delay means having a plurality of input terminals for delaying input signals from the respective input terminals in different values of delay time from each other and for superimposing the delayed signals on each other;
   a first switch means for connecting outputs of the first multiplication means to the input terminals of the delay means so that the output signals from the first multiplication means are superimposed on each other in time differences so as to compensate for arrival time differences of the reflected waves from a focus point at a reference position in the internal portions of the object, in the delay means;
   a second switch means for connecting outputs of the second multiplication means to the input terminals of the delay means so that each output signal of each second multiplication means is superimposed in a predetermined time difference on a signal that originates in the same transducer and is output from the first multiplication means, in the delay means; and
   a control means for providing the first and the second real numbers for the respective first and second multiplication means to phase shift carrier signals contained in signals formed by superimposing pairs of signals originating in the same transducers to thereby move the focus point from the reference position to a desired position.

2. An acoustic imaging system as claimed in claim 1, wherein the first and the second multiplication means are variable gain amplifiers and wherein the first and the second real numbers correspond to at least one of gain and polarity of the first and the second variable amplifiers, respectively.

3. An acoustic imaging system as claimed in claim 1, wherein the control means determines the first and the second real numbers $B_s$ and $B_c$ according to the following formulae:

$$B_s = \sin(\phi)/\sin(\omega\tau)$$

and $$B_C = \sin(\omega\tau - \phi)/\sin(\omega\tau)$$

where $\phi$ is a phase angle of the phase shift of the carrier signal, $\omega$ is an angular frequency of the carrier signal, and $\tau$ is the predetermined time difference between the pairs of signals originating in the same transducers.

4. An acoustic imaging system as claimed in claim 1, wherein the control means determines the first and the second real numbers $B_s$ and $B_c$ according to the following formulae:

$$B_s = apj \cdot \sin(\phi)/\sin(\omega\tau)$$

and $$B_c = apj \cdot \{\cos(\phi) - \sin(\phi) \cos(\omega\tau)/\sin(\omega\tau)\}$$

where $\phi$ is a phase angle of the phase shift of the carrier signal, $\omega$ is an angular frequency of the carrier signal, $\tau$ is the predetermined time difference between the pairs of signals originating in the same transducers, and apj is an apodizing value.

5. An acoustic imaging system as claimed in claim 1, wherein the delay means includes a plurality of serially connected delay elements having a delay time corresponding to the predetermined time difference, the respective input terminals of the delaying means being connected to inputs of the respective delay elements and to an output of the delay means.

6. An acoustic imaging system as claimed in claim 1, wherein the delay means includes a plurality of alternately serially connected first delay elements and second delay elements, the first delay elements having a delay time corresponding to the predetermined time difference, and the second delay elements having a delay time larger than that of the first delay elements, wherein the first switch means connects the output of the first multiplication means to the input of the first delay elements, and wherein the second switch means connects the output of the second multiplication means to input of the second delay elements.

7. An acoustic imaging system as claimed in claim 1, wherein output signals from the first and the second multiplication means generated in at least two adjacent transducers are summed up into one signal.

* * * * *

UNITED STATES PATENT AND TRADEMARK OFFICE
CERTIFICATE OF CORRECTION

PATENT NO. : 5,375,470

DATED : December 27, 1994

INVENTOR(S) : Tetsuya MATSUSHIMA et al.

It is certified that error appears in the above-indentified patent and that said Letters Patent is hereby corrected as shown below:

Column 10, line 13, delete ",".

Column 14, line 27, change "$u(t-t_0) = a(t-t_0) \sin \{\omega(t-t_0)+\omega\}$" to
--$u(t-t_0) = a(t-t_0) \sin \{\omega(t-t_0)+\phi\}$--.

Column14, line 36, change "$u'(t-t_0) = a(t) \sin \{\omega(t-t_0)+\omega\}$" to
--$u'(t-t_0) = a(t) \sin \{\omega(t-t_0)+\phi\}$--.

Signed and Sealed this

Twenty-eight Day of March, 1995

Attest:

BRUCE LEHMAN

*Attesting Officer*  *Commissioner of Patents and Trademarks*